United States Patent
Long

(10) Patent No.: US 9,723,607 B2
(45) Date of Patent: Aug. 1, 2017

(54) METHOD FOR TRANSMITTING MACHINE TYPE COMMUNICATION DOWNLINK DATA, BASE STATION, AND USER EQUIPMENT

(71) Applicant: Huawei Device Co., Ltd., Shenzhen (CN)

(72) Inventor: Shuiping Long, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 150 days.

(21) Appl. No.: 14/834,740

(22) Filed: Aug. 25, 2015

(65) Prior Publication Data
US 2015/0365926 A1  Dec. 17, 2015

Related U.S. Application Data

(63) Continuation of application No. PCT/CN2013/082413, filed on Aug. 27, 2013.

(51) Int. Cl.
  *H04W 4/00* (2009.01)
  *H04W 72/04* (2009.01)
  (Continued)

(52) U.S. Cl.
  CPC ......... *H04W 72/042* (2013.01); *H04L 5/0046* (2013.01); *H04L 5/0062* (2013.01);
  (Continued)

(58) Field of Classification Search
  CPC . H04L 27/2649; H04L 5/0007; H04L 5/0046; H04L 5/0062; H04L 5/0094
  (Continued)

(56) References Cited

U.S. PATENT DOCUMENTS

| | | | |
|---|---|---|---|
| 8,432,982 B2* | 4/2013 | Pi | ............... H04L 5/0007 375/260 |
| 9,237,522 B2* | 1/2016 | Golitschek Edler Von Elbwart | ............ H04W 52/0216 |

(Continued)

FOREIGN PATENT DOCUMENTS

| | | |
|---|---|---|
| CN | 102238243 A | 11/2011 |
| CN | 102244631 A | 11/2011 |

(Continued)

OTHER PUBLICATIONS

Foreign Communication From a Counterpart Application, Chinese Application No. 201380031107, Chinese Office Action dated Jul. 5, 2016, 5 pages.

(Continued)

*Primary Examiner* — Khaled Kassim
*Assistant Examiner* — Berhanu Belete
(74) *Attorney, Agent, or Firm* — Conley Rose, P.C.

(57) ABSTRACT

A method for transmitting machine type communication (MTC) downlink data. The method includes acquiring, by a user equipment (UE), downlink transmission parameters, where the downlink transmission parameters include a quantity of resource blocks in downlink transmission bandwidth that is configured by a base station for the UE, an antenna port used by the base station for sending the MTC downlink data, and at least one of the following a cell-specific frequency shift value or a cyclic prefix (CP) type, setting, by the UE, a local oscillator frequency of a receiver according to the downlink transmission parameters; and receiving, by the UE, the MTC downlink data sent by the base station, where a subcarrier located in a subcarrier reservation location does not carry any data signal or reference signal, and the subcarrier reservation location is determined in the (Continued)

downlink transmission bandwidth by the base station according to the downlink transmission parameters.

28 Claims, 4 Drawing Sheets

(51) Int. Cl.
*H04L 27/26* (2006.01)
*H04W 74/00* (2009.01)
*H04L 5/00* (2006.01)
*H04W 88/08* (2009.01)

(52) U.S. Cl.
CPC ........ *H04L 5/0094* (2013.01); *H04L 27/2649* (2013.01); *H04W 4/005* (2013.01); *H04W 74/006* (2013.01); *H04L 5/0007* (2013.01); *H04W 88/08* (2013.01)

(58) Field of Classification Search
USPC ......................................................... 370/329
See application file for complete search history.

(56) References Cited

U.S. PATENT DOCUMENTS

| | | | |
|---|---|---|---|
| 9,553,704 B2* | 1/2017 | You | H04L 5/0048 |
| 2010/0188975 A1 | 7/2010 | Raleigh | |
| 2011/0122974 A1* | 5/2011 | Sundstrom | H04B 1/28 |
| | | | 375/316 |
| 2012/0089845 A1 | 4/2012 | Raleigh | |
| 2012/0134334 A1* | 5/2012 | Ko | H04B 7/0413 |
| | | | 370/329 |
| 2012/0155338 A1* | 6/2012 | Noh | H04L 5/0023 |
| | | | 370/280 |
| 2013/0005375 A1* | 1/2013 | Chen | H04W 52/346 |
| | | | 455/509 |
| 2013/0058317 A1 | 3/2013 | Park et al. | |
| 2013/0070708 A1 | 3/2013 | Bai et al. | |
| 2013/0114393 A1 | 5/2013 | Lee | |
| 2013/0114570 A1 | 5/2013 | Park et al. | |
| 2013/0114587 A1 | 5/2013 | Khoryaev et al. | |
| 2013/0136072 A1* | 5/2013 | Bachmann | H04W 4/00 |
| | | | 370/329 |
| 2013/0315168 A1* | 11/2013 | Frank | G01S 5/10 |
| | | | 370/329 |
| 2014/0016622 A1* | 1/2014 | Bao | H04L 5/0085 |
| | | | 370/336 |
| 2014/0140422 A1* | 5/2014 | Li | H04L 5/0051 |
| | | | 375/260 |
| 2014/0307641 A1* | 10/2014 | Shen | H04L 1/206 |
| | | | 370/329 |
| 2014/0307691 A1 | 10/2014 | Zhang et al. | |

FOREIGN PATENT DOCUMENTS

| | | |
|---|---|---|
| CN | 102413090 A | 4/2012 |
| CN | 102447662 A | 5/2012 |
| CN | 102573094 A | 7/2012 |
| CN | 103069763 A | 4/2013 |
| CN | 103109506 A | 5/2013 |
| WO | 2010111863 A1 | 10/2010 |
| WO | 2012104633 A1 | 8/2012 |

OTHER PUBLICATIONS

Dahlman, E., et al., "4G LTE/LTE-Advanced for Mobile Broadband," Elsevier, Mar. 29, 2011, 61 pages.
Foreign Communication From a Counterpart Application, European Application No. 13892561.5, Partial Supplementary European Search Report dated Feb. 8, 2016, 8 pages.
Foreign Communication From a Counterpart Application, European Application No. 13892561.5, Extended European Search Report dated Jun. 23, 2016, 13 pages.
Foreign Communication From a Counterpart Application, PCT Application No. PCT/CN2013/082413, English Translation of International Search Report dated Jun. 4, 2014, 2 pages.
Foreign Communication From a Counterpart Application, PCT Application No. PCT/CN2013/082413, Written Opinion dated Jun. 4, 2014, 4 pages.

* cited by examiner

METHOD FOR TRANSMITTING MACHINE TYPE COMMUNICATION DOWNLINK DATA, BASE STATION, AND USER EQUIPMENT

CROSS-REFERENCE TO RELATED APPLICATIONS

This application is a continuation of International Application No. PCT/CN2013/082413, filed on Aug. 27, 2013, which is hereby incorporated by reference in its entirety.

TECHNICAL FIELD

The present disclosure belongs to the communications field, and in particular, to a method for transmitting machine type communication (MTC) downlink data, a base station, and user equipment (UE).

BACKGROUND

On the Internet of Things, an article is connected to the Internet by using an information sensing device, to implement intelligent identification and management. The information sensing device used on the Internet of Things includes a radio frequency identification apparatus, an infrared sensor, a global positioning system, a laser scanner, and the like. By combining with the Internet, the foregoing device may implement remote sensing and control of all articles (for example, buildings, goods, climate, machines, and people), and is widely applied to multiple fields such as intelligent transportation, environmental protection, government work, public security, smart household, smart fire fighting, industry monitoring, elderly care, and personal health.

It is generally regarded that a first phase of the Internet of Things is machine to machine (M2M), that is, implementing free communication between machines. For a communications network (for example, a mobile cellular network), this communications service undertaken by the communications network is called MTC.

However, the large-scale development of M2M/MTC requires several necessary conditions, and one of the conditions is reduction of costs of a terminal (a communications module). Therefore, the Third Generation Partnership Project (3GPP) puts forward a low-cost UE, which only supports relatively small system bandwidth, for example, only supports channel bandwidth of 1.4 megahertz (MHz) or 3 MHz, or only supports transmission bandwidth of six resource blocks (RB) or 15 resource blocks. Because only relatively small system bandwidth needs to be considered during product design and it is not required to consider a problem of a Long Term Evolution (LTE) system whose access channel bandwidth is 20 MHz or transmission bandwidth is 100 resource blocks, costs of the terminal can be saved greatly. In addition, if the foregoing UE only supporting small bandwidth is applied to an LTE system, it is helpful in migrating an existing M2M application deployed on a Global System for Mobile Communications (GSM)/General Packet Radio Service (GPRS) system/network to the LTE system, so that an operator can re-develop a frequency band of the existing GSM or GPRS system.

Under a background of a communications service of MTC, before sending downlink MTC data to a UE, a base station needs to perform MTC resource configuration for the UE in downlink system bandwidth of the base station. The MTC resource configuration is used to reserve a resource for the UE in the downlink system bandwidth, so as to send the downlink MTC data to the UE by using the reserved resource. Different base stations may configure a resource reserved for a UE in different locations of downlink system bandwidth. This flexible MTC resource configuration manner is helpful in coordinating interference between cells and extending an MTC capacity.

In the foregoing MTC resource configuration manner, if a small-bandwidth UE uses narrow band radio frequency reception, design may be greatly simplified and costs of the UE may be reduced. As shown in FIG. 1, a horizontal axis represents downlink system bandwidth of a base station, and a dashed area is a resource that is reserved by a base station in the downlink system bandwidth of the base station for a UE using narrow band radio frequency reception. In an original common reception manner of the UE, a local oscillator frequency of a receiver of the UE is set to be at a center of the entire downlink system bandwidth; in a data reception process of the receiver of the UE, a direct current component (called a system direct current) is easily generated in a location of the local oscillator frequency of the receiver, thereby affecting reception of downlink data. Therefore, when the base station transmits a downlink signal, a direct current subcarrier is sent in a location in which $f_0$ shown in FIG. 1 is located. The direct current subcarrier is not used to transmit data, which ensures correctness of downlink data reception performed by the UE. However, when the UE uses narrow band radio frequency reception, the local oscillator frequency of the receiver of the UE is set to be in a central location of the resource that is reserved by the base station for the UE, that is, a location in which $f_1$ in FIG. 1 is located. Therefore, the direct current component generated by the receiver of the UE moves to the location in which $f_1$ is located (called an MTC direct current). Obviously, the location in which the MTC direct current is located does not overlap the location in which the original system direct current is located, and a subcarrier in the location in which the MTC direct current is located is still used to transmit the downlink data. Therefore, generation of an MTC direct current affects accurate reception of data on a subcarrier nearby the MTC direct current.

SUMMARY

An objective of embodiments of the present disclosure is to provide a method for transmitting MTC downlink data, so as to improve accuracy of receiving MTC data.

According to a first aspect, a method for sending machine type communication MTC downlink data is provided, including configuring, by a base station, downlink transmission bandwidth for user equipment UE; determining, by the base station, an antenna port used for sending the MTC downlink data; determining, by the base station, a subcarrier reservation location in the downlink transmission bandwidth according to downlink transmission parameters, where the downlink transmission parameters include a quantity of resource blocks in the downlink transmission bandwidth, the antenna port, and at least one of the following: a cell-specific frequency shift value or a cyclic prefix (CP) type; and sending the MTC downlink data to the UE, so that the UE receives the MTC downlink data after setting a local oscillator frequency of a receiver according to the downlink transmission parameters, where a subcarrier located in the subcarrier reservation location does not carry any data signal or reference signal, and a central frequency of the subcarrier in the subcarrier reservation location is the same as the local oscillator frequency, set by the UE, of the receiver.

In a first possible implementation manner of the first aspect, when the quantity of resource blocks is an odd number and the antenna port is any one of Ports 0 to 3, the downlink transmission parameters further include the cell-specific frequency shift value, and the determining, by the base station, a subcarrier reservation location in the downlink transmission bandwidth according to downlink transmission parameters is, when the cell-specific frequency shift value is 1 or 4, determining, by the base station, a location in which the fifth or sixth subcarrier of a resource block located at a center of the downlink transmission bandwidth is located, as the subcarrier reservation location; when the cell-specific frequency shift value is 0 or 3, determining, by the base station, a location in which the fifth subcarrier of a resource block located at a center of the downlink transmission bandwidth is located, as the subcarrier reservation location; or when the cell-specific frequency shift value is 2 or 5, determining, by the base station, a location in which the sixth subcarrier of a resource block located at a center of the downlink transmission bandwidth is located, as the subcarrier reservation location.

In a second possible implementation manner of the first aspect, when the quantity of resource blocks is an odd number and the antenna port is Port 5, the downlink transmission parameters further include the cell-specific frequency shift value and the CP type, and the determining, by the base station, a subcarrier reservation location in the downlink transmission bandwidth according to downlink transmission parameters is, if the CP type is a normal CP, when the cell-specific frequency shift value is 0 or 2, determining, by the base station, a location in which the fifth subcarrier of a resource block located at a center of the downlink transmission bandwidth is located, as the subcarrier reservation location; or when the cell-specific frequency shift value is 1, determining, by the base station, a location in which the sixth subcarrier of a resource block located at a center of the downlink transmission bandwidth is located, as the subcarrier reservation location; or if the CP type is an extended CP, when the cell-specific frequency shift value is 0, determining, by the base station, a location in which the fourth or seventh subcarrier of a resource block located at a center of the downlink transmission bandwidth is located, as the subcarrier reservation location; when the cell-specific frequency shift value is 1, determining, by the base station, a location in which the fifth subcarrier of a resource block located at a center of the downlink transmission bandwidth is located, as the subcarrier reservation location; or when the cell-specific frequency shift value is 2, determining, by the base station, a location in which the sixth subcarrier of a resource block located at a center of the downlink transmission bandwidth is located, as the subcarrier reservation location.

In a third possible implementation manner of the first aspect, when the quantity of resource blocks is an odd number, the downlink transmission parameters further include the CP type, and the determining, by the base station, a subcarrier reservation location in the downlink transmission bandwidth according to downlink transmission parameters is, if the CP type is a normal CP, when the antenna port is one or more of Ports 7, 8, 11, and 13, determining, by the base station, a location in which the fifth subcarrier of a resource block located at a center of the downlink transmission bandwidth is located, as the subcarrier reservation location; or when the antenna port is one or more of Ports 9, 10, 12, and 14, determining, by the base station, a location in which the sixth subcarrier of a resource block located at a center of the downlink transmission bandwidth is located, as the subcarrier reservation location; or if the CP type is an extended CP, when the antenna port is Port 7 or Port 8, determining, by the base station, a location in which the fifth or sixth subcarrier of a resource block located at a center of the downlink transmission bandwidth is located, as the subcarrier reservation location.

In a fourth possible implementation manner of the first aspect, when the quantity of resource blocks is an even number and the antenna port is any one of Ports 0 to 3, the downlink transmission parameters further include the cell-specific frequency shift value, and the determining, by the base station, a subcarrier reservation location in the downlink transmission bandwidth according to downlink transmission parameters is, when the cell-specific frequency shift value is 1 or 4, determining, by the base station, a location in which the eleventh subcarrier of a first resource block or the zeroth subcarrier of a second resource block is located, as the subcarrier reservation location; when the cell-specific frequency shift value is 0 or 3, determining, by the base station, a location in which the eleventh subcarrier of a first resource block is located, as the subcarrier reservation location; or when the cell-specific frequency shift value is 2 or 5, determining, by the base station, a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

In a fifth possible implementation manner of the first aspect, when the quantity of resource blocks is an even number and the antenna port is Port 5, the downlink transmission parameters further include the cell-specific frequency shift value and the CP type, and the determining, by the base station, a subcarrier reservation location in the downlink transmission bandwidth according to downlink transmission parameters is, if the CP type is a normal CP, when the cell-specific frequency shift value is 0 or 2, determining, by the base station, a location in which the eleventh subcarrier of a first resource block is located, as the subcarrier reservation location; or when the cell-specific frequency shift value is 1, determining, by the base station, a location in which the zeroth subcarrier of a second resource block is located, as the subcarrier reservation location; or if the CP type is an extended CP, when the cell-specific frequency shift value is 0, determining, by the base station, a location in which the tenth subcarrier of a first resource block or the first subcarrier of a second resource block is located, as the subcarrier reservation location; when the cell-specific frequency shift value is 1, determining, by the base station, a location in which the eleventh subcarrier of a first resource block is located, as the subcarrier reservation location; or when the cell-specific frequency shift value is 2, determining, by the base station, a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

In a sixth possible implementation manner of the first aspect, when the quantity of resource blocks is an even number, the downlink transmission parameters further include the CP type, and the determining, by the base station, a subcarrier reservation location in the downlink transmission bandwidth according to downlink transmission parameters is, if the CP type is a normal CP, when the antenna port is one or more of Ports 7, 8, 11, and 13, determining, by the base station, a location in which the zeroth subcarrier of a second resource block is located, as the subcarrier reservation location; or when the antenna port is one or more of Ports 9, 10, 12, and 14, determining, by the base station, a location in which the eleventh subcarrier of a first resource block is located, as the subcarrier reservation location; or if the CP type is an extended CP, when the antenna port is Port 7 or Port 8, determining, by the base station, a location in which the zeroth subcarrier of a second resource block or the eleventh subcarrier of a first resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

With reference to the third possible implementation manner of the first aspect or the sixth possible implementation manner of the first aspect, in a seventh possible implementation manner, the determining, by the base station, an antenna port used for sending the MTC downlink data includes configuring, by the base station among the antenna ports Ports 7, 8, 11, and 13, the antenna port for an enhanced physical downlink control channel (ePDCCH) and a physical downlink shared channel (PDSCH); or configuring, by the base station among the antenna ports Ports 9, 10, 12, and 14, the antenna port for an ePDCCH and a PDSCH.

With reference to the third possible implementation manner of the first aspect or the sixth possible implementation manner of the first aspect, in an eighth possible implementation manner, the base station supports multi-layer transmission, and the determining, by the base station, an antenna port used for sending the MTC downlink data includes configuring, by the base station among the antenna ports Ports 7, 8, 11, and 13, the antenna port for the UE; or configuring, by the base station among the antenna ports Ports 9, 10, 12, and 14, the antenna port for the UE.

According to a second aspect, a method for receiving machine type communication MTC downlink data is provided, including acquiring, by UE, downlink transmission parameters, where the downlink transmission parameters include a quantity of resource blocks in downlink transmission bandwidth that is configured by a base station for the UE, an antenna port used by the base station for sending the MTC downlink data, and at least one of the following: a cell-specific frequency shift value or a CP type; setting, by the UE, a local oscillator frequency of a receiver according to the downlink transmission parameters; and receiving, by the UE, the MTC downlink data sent by the base station, where a subcarrier located in a subcarrier reservation location does not carry any data signal or reference signal, the subcarrier reservation location is determined in the downlink transmission bandwidth by the base station according to the downlink transmission parameters, and a central frequency of the subcarrier in the subcarrier reservation location is the same as the local oscillator frequency, set by the UE, of the receiver.

In a first possible implementation manner of the second aspect, when the quantity of resource blocks is an odd number and the antenna port is any one of Ports 0 to 3, the downlink transmission parameters further include the cell-specific frequency shift value, and the setting, by the UE, a local oscillator frequency of a receiver according to the downlink transmission parameters is, when the cell-specific frequency shift value is 1 or 4, shifting, by the UE, the local oscillator frequency of the receiver from a central location of the downlink transmission bandwidth to a low frequency or a high frequency by half a subcarrier; when the cell-specific frequency shift value is 0 or 3, shifting, by the UE, the local oscillator frequency of the receiver from a central location of the downlink transmission bandwidth to a low frequency by half a subcarrier; or when the cell-specific frequency shift value is 2 or 5, shifting, by the UE, the local oscillator frequency of the receiver from a central location of the downlink transmission bandwidth to a high frequency by half a subcarrier.

In a second possible implementation manner of the second aspect, when the quantity of resource blocks is an odd number and the antenna port is Port 5, the downlink transmission parameters further include the cell-specific frequency shift value and the CP type, and the setting, by the UE, a local oscillator frequency of a receiver according to the downlink transmission parameters is, if the CP type is a normal CP, when the cell-specific frequency shift value is 0 or 2, shifting, by the UE, the local oscillator frequency of the receiver from a central location of the downlink transmission bandwidth to a low frequency by half a subcarrier; or when the cell-specific frequency shift value is 1, shifting, by the UE, the local oscillator frequency of the receiver from a central location of the downlink transmission bandwidth to a high frequency by half a subcarrier; or if the CP type is an extended CP, when the cell-specific frequency shift value is 0, shifting, by the UE, the local oscillator frequency of the receiver from a central location of the downlink transmission bandwidth to a high frequency or a low frequency by 1.5 subcarriers; when the cell-specific frequency shift value is 1, shifting, by the UE, the local oscillator frequency of the receiver from a central location of the downlink transmission bandwidth to a low frequency by half a subcarrier; or when the cell-specific frequency shift value is 2, shifting, by the UE, the local oscillator frequency of the receiver from a central location of the downlink transmission bandwidth to a high frequency by half a subcarrier.

In a third possible implementation manner of the second aspect, when the quantity of resource blocks is an odd number, the downlink transmission parameters further include the CP type, and the setting, by the UE, a local oscillator frequency of a receiver according to the downlink transmission parameters is, if the CP type is a normal CP, when the antenna port is one or more of Ports 7, 8, 11, and 13, setting, by the UE, the local oscillator frequency of the receiver to be in a location in which the fifth subcarrier of a resource block located at a center of the downlink transmission bandwidth is located; or when the antenna port is one or more of Ports 9, 10, 12, and 14, setting, by the UE, the local oscillator frequency of the receiver to be in a location in which the sixth subcarrier of a resource block located at a center of the downlink transmission bandwidth is located; or if the CP type is an extended CP, when the antenna port is Port 7 or Port 8, setting, by the UE, the local oscillator frequency of the receiver to be in a location in which the fifth or sixth subcarrier of a resource block located at a center of the downlink transmission bandwidth is located.

In a fourth possible implementation manner of the second aspect, the quantity of resource blocks is an even number, and the setting, by the UE, a local oscillator frequency of a receiver according to the downlink transmission parameters is, setting, by the UE, the local oscillator frequency of the receiver to be between a first resource block and a second resource block, where the first resource block and the second block resource are two adjacent resource blocks that are located at a center of the downlink transmission bandwidth, and a frequency at which the first resource block is located is higher than a frequency at which the second resource block is located.

In a fifth possible implementation manner of the second aspect, the quantity of resource blocks is an even number, the downlink transmission bandwidth covers a system direct current, and the setting, by the UE, a local oscillator frequency of a receiver according to the downlink transmission parameters is, setting, by the UE, the local oscillator frequency of the receiver to be in a central location of a first resource block or a central location of a second resource block, where the first resource block and the second block resource are two adjacent resource blocks that are located at a center of the downlink transmission bandwidth, and a frequency at which the first resource block is located is higher than a frequency at which the second resource block is located.

With reference to the second aspect or any one of the possible implementation manners of the second aspect, in a sixth possible implementation manner, the receiving, by the UE, the MTC downlink data sent by the base station includes discarding, by the UE, a common reference signal (CRS) resource element (RE) interfered by an MTC direct current.

According to a third aspect, a base station is provided, including a configuring unit configured to configure downlink transmission bandwidth for user equipment UE; a first determining unit configured to determine an antenna port used for sending the MTC downlink data; a second determining unit configured to determine a subcarrier reservation location in the downlink transmission bandwidth according to downlink transmission parameters, where the downlink transmission parameters include a quantity of resource blocks in the downlink transmission bandwidth configured by the configuring unit, the antenna port determined by the first determining unit, and at least one of the following: a cell-specific frequency shift value or a CP type; and a sending unit configured to acquire the subcarrier reservation location determined by the second determining unit, and send the MTC downlink data to the UE, so that the UE receives the MTC downlink data after setting a local oscillator frequency of a receiver according to the downlink transmission parameters, where a subcarrier located in the subcarrier reservation location does not carry any data signal or reference signal, and a central frequency of the subcarrier in the subcarrier reservation location is the same as the local oscillator frequency, set by the UE, of the receiver.

In a first possible implementation manner of the third aspect, when the quantity of resource blocks is an odd number and the antenna port is any one of Ports 0 to 3, the downlink transmission parameters further include the cell-specific frequency shift value, and the second determining unit is configured to, when the cell-specific frequency shift value is 1 or 4, determine a location in which the fifth or sixth subcarrier of a resource block located at a center of the downlink transmission bandwidth is located, as the subcarrier reservation location; when the cell-specific frequency shift value is 0 or 3, determine a location in which the fifth subcarrier of a resource block located at a center of the downlink transmission bandwidth is located, as the subcarrier reservation location; or when the cell-specific frequency shift value is 2 or 5, determine a location in which the sixth subcarrier of a resource block located at a center of the downlink transmission bandwidth is located, as the subcarrier reservation location.

In a second possible implementation manner of the third aspect, when the quantity of resource blocks is an odd number and the antenna port is Port 5, the downlink transmission parameters further include the cell-specific frequency shift value and the CP type, and the second determining unit is configured to, if the CP type is a normal CP, when the cell-specific frequency shift value is 0 or 2, determine a location in which the fifth subcarrier of a resource block located at a center of the downlink transmission bandwidth is located, as the subcarrier reservation location; or when the cell-specific frequency shift value is 1, determine a location in which the sixth subcarrier of a resource block located at a center of the downlink transmission bandwidth is located, as the subcarrier reservation location; or if the CP type is an extended CP, when the cell-specific frequency shift value is 0, determine a location in which the fourth or seventh subcarrier of a resource block located at a center of the downlink transmission bandwidth is located, as the subcarrier reservation location; when the cell-specific frequency shift value is 1, determine a location in which the fifth subcarrier of a resource block located at a center of the downlink transmission bandwidth is located, as the subcarrier reservation location; or when the cell-specific frequency shift value is 2, determine a location in which the sixth subcarrier of a resource block located at a center of the downlink transmission bandwidth is located, as the subcarrier reservation location.

In a third possible implementation manner of the third aspect, when the quantity of resource blocks is an odd number, the downlink transmission parameters further include the CP type, and the second determining unit is configured to, if the CP type is a normal CP, when the antenna port is one or more of Ports 7, 8, 11, and 13, determine a location in which the fifth subcarrier of a resource block located at a center of the downlink transmission bandwidth is located, as the subcarrier reservation location; or when the antenna port is one or more of Ports 9, 10, 12, and 14, determine a location in which the sixth subcarrier of a resource block located at a center of the downlink transmission bandwidth is located, as the subcarrier reservation location; or if the CP type is an extended CP, when the antenna port is Port 7 or Port 8, determine a location in which the fifth or sixth subcarrier of a resource block located at a center of the downlink transmission bandwidth is located, as the subcarrier reservation location.

In a fourth possible implementation manner of the third aspect, when the quantity of resource blocks is an even number and the antenna port is any one of Ports 0 to 3, the downlink transmission parameters further include the cell-specific frequency shift value, and the second determining unit is configured to, when the cell-specific frequency shift value is 1 or 4, determine a location in which the eleventh subcarrier of a first resource block or the zeroth subcarrier of a second resource block is located, as the subcarrier reservation location; when the cell-specific frequency shift value is 0 or 3, determine a location in which the eleventh subcarrier of a first resource block is located, as the subcarrier reservation location; or when the cell-specific frequency shift value is 2 or 5, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

In a fifth possible implementation manner of the third aspect, when the quantity of resource blocks is an even number and the antenna port is Port 5, the downlink transmission parameters further include the cell-specific frequency shift value and the CP type, and the second determining unit is configured to, if the CP type is a normal CP, when the cell-specific frequency shift value is 0 or 2, determine a location in which the eleventh subcarrier of a first resource block is located, as the subcarrier reservation location; or when the cell-specific frequency shift value is 1, determine a location in which the zeroth subcarrier of a second resource block is located, as the subcarrier reservation location; or if the CP type is an extended CP, when the cell-specific frequency shift value is 0, determine a location in which the tenth subcarrier of a first resource block or the first subcarrier of a second resource block is located, as the subcarrier reservation location; when the cell-specific frequency shift value is 1, determine a location in which the eleventh subcarrier of a first resource block is located, as the subcarrier reservation location; or when the cell-specific frequency shift value is 2, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

In a sixth possible implementation manner of the third aspect, when the quantity of resource blocks is an even number, the downlink transmission parameters further include the CP type, and the second determining unit is configured to, if the CP type is a normal CP, when the antenna port is one or more of Ports 7, 8, 11, and 13, determine a location in which the zeroth subcarrier of a second resource block is located, as the subcarrier reservation location; or when the antenna port is one or more of Ports 9, 10, 12, and 14, determine a location in which the eleventh subcarrier of a first resource block is located, as the subcarrier reservation location; or if the CP type is an extended CP, when the antenna port is Port 7 or Port 8, determine a location in which the zeroth subcarrier of a second resource block or the eleventh subcarrier of a first resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

With reference to the third possible implementation manner of the third aspect or the sixth possible implementation manner of the third aspect, in a seventh possible implementation manner, the sending unit is configured to configure, among the antenna ports Ports 7, 8, 11, and 13, the antenna port for an enhanced physical downlink control channel ePDCCH and a physical downlink shared channel PDSCH; or configure, among the antenna ports Ports 9, 10, 12, and 14, the antenna port for an ePDCCH and a PDSCH.

With reference to the third possible implementation manner of the third aspect or the sixth possible implementation manner of the third aspect, in an eighth possible implementation manner, the base station supports multi-layer transmission, and the sending unit is configured to configure, among the antenna ports Ports 7, 8, 11, and 13, the antenna port for the UE; or configure, among the antenna ports Ports 9, 10, 12, and 14, the antenna port for the UE.

According to a fourth aspect, user equipment UE is provided, including an acquiring unit configured to acquire downlink transmission parameters, where the downlink transmission parameters include a quantity of resource blocks in downlink transmission bandwidth that is configured by a base station for the UE, an antenna port used by the base station for sending the MTC downlink data, and at least one of the following: a cell-specific frequency shift value or a CP type; a setting unit configured to set a local oscillator frequency of a receiver according to the downlink transmission parameters acquired by the acquiring unit; and a receiving unit configured to receive, by the UE, the MTC downlink data sent by the base station, where a subcarrier located in a subcarrier reservation location does not carry any data signal or reference signal, the subcarrier reservation location is determined in the downlink transmission bandwidth by the base station according to the downlink transmission parameters, and a central frequency of the subcarrier in the subcarrier reservation location is the same as the local oscillator frequency, set by the UE, of the receiver.

In a first possible implementation manner of the fourth aspect, when the quantity of resource blocks is an odd number and the antenna port is any one of Ports 0 to 3, the downlink transmission parameters further include the cell-specific frequency shift value, and the setting unit is configured to, when the cell-specific frequency shift value is 1 or 4, shift the local oscillator frequency of the receiver from a central location of the downlink transmission bandwidth to a low frequency or a high frequency by half a subcarrier; when the cell-specific frequency shift value is 0 or 3, shift the local oscillator frequency of the receiver from a central location of the downlink transmission bandwidth to a low frequency by half a subcarrier; or when the cell-specific frequency shift value is 2 or 5, shift the local oscillator frequency of the receiver from a central location of the downlink transmission bandwidth to a high frequency by half a subcarrier.

In a second possible implementation manner of the fourth aspect, when the quantity of resource blocks is an odd number and the antenna port is Port 5, the downlink transmission parameters further include the cell-specific frequency shift value and the CP type, and the setting unit is configured to, if the CP type is a normal CP, when the cell-specific frequency shift value is 0 or 2, shift the local oscillator frequency of the receiver from a central location of the downlink transmission bandwidth to a low frequency by half a subcarrier; or when the cell-specific frequency shift value is 1, shift the local oscillator frequency of the receiver from a central location of the downlink transmission bandwidth to a high frequency by half a subcarrier; or if the CP type is an extended CP, when the cell-specific frequency shift value is 0, shift the local oscillator frequency of the receiver from a central location of the downlink transmission bandwidth to a high frequency or a low frequency by 1.5 subcarriers; when the cell-specific frequency shift value is 1, shift the local oscillator frequency of the receiver from a central location of the downlink transmission bandwidth to a low frequency by half a subcarrier; or when the cell-specific frequency shift value is 2, shift the local oscillator frequency of the receiver from a central location of the downlink transmission bandwidth to a high frequency by half a subcarrier.

In a third possible implementation manner of the fourth aspect, when the quantity of resource blocks is an odd number, the downlink transmission parameters further include the CP type, and the setting unit is configured to if the CP type is a normal CP, when the antenna port is one or more of Ports 7, 8, 11, and 13, set the local oscillator frequency of the receiver to be in a location in which the fifth subcarrier of a resource block located at a center of the downlink transmission bandwidth is located; or when the antenna port is one or more of Ports 9, 10, 12, and 14, set the local oscillator frequency of the receiver to be in a location in which the sixth subcarrier of a resource block located at a center of the downlink transmission bandwidth is located, or if the CP type is an extended CP when the antenna port is Port 7 or Port 8, set the local oscillator frequency of the receiver to be in a location in which the fifth or sixth subcarrier of a resource block located at a center of the downlink transmission bandwidth is located.

In a fourth possible implementation manner of the fourth aspect, the quantity of resource blocks is an even number, and the setting unit is configured to set the local oscillator frequency of the receiver to be between a first resource block and a second resource block, where the first resource block and the second resource block are two adjacent resource blocks that are located at a center of the downlink transmission bandwidth, and a frequency at which the first resource block is located is higher than a frequency at which the second resource block is located.

In a fifth possible implementation manner of the fourth aspect, the quantity of resource blocks is an even number, the downlink transmission bandwidth covers a system direct current, and the setting unit is configured to set the local oscillator frequency of the receiver to be in a central location of a first resource block or a central location of a second resource block, where the first resource block and the second resource block are two adjacent resource blocks that are located at a center of the downlink transmission bandwidth, and a frequency at which the first resource block is located is higher than a frequency at which the second resource block is located.

With reference to the fourth aspect or any one of the possible implementation manners of the fourth aspect, in a sixth possible implementation manner, the receiving unit is configured to discard a CRS RE interfered by an MTC direct current.

According to a fifth aspect, a base station is provided, including a processor, a memory, a bus, and a radio frequency module, where the processor and the memory communicate with each other by using the bus; the memory is configured to store a program; the processor is configured to execute the program stored in the memory, and when the program is executed, the processor is configured to configure downlink transmission bandwidth for user equipment UE; determine an antenna port used for sending the MTC downlink data; and determine a subcarrier reservation location in the downlink transmission bandwidth according to downlink transmission parameters, where the downlink transmission parameters include a quantity of resource blocks in the downlink transmission bandwidth, the antenna port, and at least one of the following: a cell-specific frequency shift value or a CP type; and the radio frequency module is connected to the processor and is configured to send the MTC downlink data to the UE, so that the UE receives the MTC downlink data after setting a local oscillator frequency of a receiver according to the downlink transmission parameters, where a subcarrier located in the subcarrier reservation location does not carry any data signal or reference signal, and a central frequency of the subcarrier in the subcarrier reservation location is the same as the local oscillator frequency, set by the UE, of the receiver.

In a first possible implementation manner of the fifth aspect, the processor is configured to configure the downlink transmission bandwidth for the UE; determine the antenna port used for sending the MTC downlink data; and when the quantity of resource blocks is an odd number, the antenna port is any one of Ports 0 to 3, and the cell-specific frequency shift value is 1 or 4, determine a location in which the fifth or sixth subcarrier of a resource block located at a center of the downlink transmission bandwidth is located, as the subcarrier reservation location; or when the quantity of resource blocks is an odd number, the antenna port is any one of Ports 0 to 3, and the cell-specific frequency shift value is 0 or 3, determine a location in which the fifth subcarrier of a resource block located at a center of the downlink transmission bandwidth is located, as the subcarrier reservation location; or when the quantity of resource blocks is an odd number, the antenna port is any one of Ports 0 to 3, and the cell-specific frequency shift value is 2 or 5, determine a location in which the sixth subcarrier of a resource block located at a center of the downlink transmission bandwidth is located, as the subcarrier reservation location.

In a second possible implementation manner of the fifth aspect, the processor is configured to configure the downlink transmission bandwidth for the UE; determine the antenna port used for sending the MTC downlink data; and when the quantity of resource blocks is an odd number, the antenna port is Port 5, the CP type is a normal CP, and the cell-specific frequency shift value is 0 or 2, determine a location in which the fifth subcarrier of a resource block located at a center of the downlink transmission bandwidth is located, as the subcarrier reservation location; or when the quantity of resource blocks is an odd number, the antenna port is Port 5, the CP type is a normal CP, and the cell-specific frequency shift value is 1, determine a location in which the sixth subcarrier of a resource block located at a center of the downlink transmission bandwidth is located, as the subcarrier reservation location; or when the quantity of resource blocks is an odd number, the antenna port is Port 5, the CP type is an extended CP, and the cell-specific frequency shift value is 0, determine a location in which the fourth or seventh subcarrier of a resource block located at a center of the downlink transmission bandwidth is located, as the subcarrier reservation location; or when the quantity of resource blocks is an odd number, the antenna port is Port 5, the CP type is an extended CP, and the cell-specific frequency shift value is 1, determine a location in which the fifth subcarrier of a resource block located at a center of the downlink transmission bandwidth is located, as the subcarrier reservation location; or when the quantity of resource blocks is an odd number, the antenna port is Port 5, the CP type is an extended CP, and the cell-specific frequency shift value is 2, determine a location in which the sixth subcarrier of a resource block located at a center of the downlink transmission bandwidth is located, as the subcarrier reservation location.

In a third possible implementation manner of the fifth aspect, the processor is configured to configure the downlink transmission bandwidth for the UE; determine the antenna port used for sending the MTC downlink data; and when the quantity of resource blocks is an odd number, the CP type is a normal CP, and the antenna port is one or more of Ports 7, 8, 11, and 13, determine a location in which the fifth subcarrier of a resource block located at a center of the downlink transmission bandwidth is located, as the subcarrier reservation location; or when the quantity of resource blocks is an odd number, the CP type is a normal CP, and the antenna port is one or more of Ports 9, 10, 12, and 14, determine a location in which the sixth subcarrier of a resource block located at a center of the downlink transmission bandwidth is located, as the subcarrier reservation location; or when the quantity of resource blocks is an odd number, the CP type is an extended CP, and the antenna port is Port 7 or Port 8, determine a location in which the fifth or sixth subcarrier of a resource block located at a center of the downlink transmission bandwidth is located, as the subcarrier reservation location.

In a fourth possible implementation manner of the fifth aspect, the processor is configured to: configure the downlink transmission bandwidth for the UE; determine the antenna port used for sending the MTC downlink data; and when the quantity of resource blocks is an even number, the antenna port is any one of Ports 0 to 3, and the cell-specific frequency shift value is 1 or 4, determine a location in which the eleventh subcarrier of a first resource block or the zeroth subcarrier of a second resource block is located, as the subcarrier reservation location; or when the quantity of resource blocks is an even number, the antenna port is any one of Ports 0 to 3, and the cell-specific frequency shift value is 0 or 3, determine a location in which the eleventh subcarrier of a first resource block is located, as the subcarrier reservation location; or when the quantity of resource blocks is an even number, the antenna port is any one of Ports 0 to 3, and the cell-specific frequency shift value is 2 or 5, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

In a fifth possible implementation manner of the fifth aspect, the processor is configured to configure the downlink transmission bandwidth for the UE; determine the antenna port used for sending the MTC downlink data; and when the quantity of resource blocks is an even number, the antenna port is Port 5, the CP type is a normal CP, and the cell-specific frequency shift value is 0 or 2, determine a location in which the eleventh subcarrier of a first resource block is located, as the subcarrier reservation location; or when the quantity of resource blocks is an even number, the antenna port is Port 5, the CP type is a normal CP, and the cell-specific frequency shift value is 1, determine a location in which the zeroth subcarrier of a second resource block is located, as the subcarrier reservation location; or when the quantity of resource blocks is an even number, the antenna port is Port 5, the CP type is an extended CP, and the cell-specific frequency shift value is 0, determine a location in which the tenth subcarrier of a first resource block or the first subcarrier of a second resource block is located, as the subcarrier reservation location; or when the quantity of resource blocks is an even number, the antenna port is Port 5, the CP type is an extended CP, and the cell-specific frequency shift value is 1, determine a location in which the eleventh subcarrier of a first resource block is located, as the subcarrier reservation location; or when the quantity of resource blocks is an even number, the antenna port is Port 5, the CP type is an extended CP, and the cell-specific frequency shift value is 2, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

In a sixth possible implementation manner of the fifth aspect, the processor is configured to configure the downlink transmission bandwidth for the UE; determine the antenna port used for sending the MTC downlink data; and when the quantity of resource blocks is an even number, the CP type is a normal CP, and the antenna port is one or more of Ports 7, 8, 11, and 13, determine a location in which the zeroth subcarrier of a second resource block is located, as the subcarrier reservation location; or when the quantity of resource blocks is an even number, the CP type is a normal CP, and the antenna port is one or more of Ports 9, 10, 12, and 14, determine a location in which the eleventh subcarrier of a first resource block is located, as the subcarrier reservation location; or when the quantity of resource blocks is an even number, the CP type is an extended CP, and the antenna port is Port 7 or Port 8, determine a location in which the zeroth subcarrier of a second resource block or the eleventh subcarrier of a first resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

With reference to the third possible implementation manner of the fifth aspect or the sixth possible implementation manner of the fifth aspect, in a seventh possible implementation manner, the determining the antenna port used for sending the MTC downlink data includes configuring, among the antenna ports Ports 7, 8, 11, and 13, the antenna port for an enhanced physical downlink control channel ePDCCH and a physical downlink shared channel PDSCH; or configuring, among the antenna ports Ports 9, 10, 12, and 14, the antenna port for an ePDCCH and a PDSCH.

With reference to the third possible implementation manner of the fifth aspect or the sixth possible implementation manner of the fifth aspect, in an eighth possible implementation manner, the base station supports multi-layer transmission, and the determining the antenna port used for sending the MTC downlink data includes configuring, among the antenna ports Ports 7, 8, 11, and 13, the antenna port for the UE; or configuring, among the antenna ports Ports 9, 10, 12, and 14, the antenna port for the UE.

According to a sixth aspect, user equipment UE is provided, including a processor, a memory, a bus, and a radio frequency module, where the processor and the memory communicate with each other by using the bus; the memory is configured to store a program; the processor is configured to execute the program stored in the memory, and when the program is executed, the UE is configured to acquire downlink transmission parameters, where the downlink transmission parameters include a quantity of resource blocks in downlink transmission bandwidth that is configured by a base station for the UE, an antenna port used by the base station for sending the MTC downlink data, and at least one of the following: a cell-specific frequency shift value or a CP type; and set a local oscillator frequency of a receiver according to the downlink transmission parameters; and the radio frequency module is configured to receive the MTC downlink data sent by the base station, where a subcarrier located in a subcarrier reservation location does not carry any data signal or reference signal, the subcarrier reservation location is determined in the downlink transmission bandwidth by the base station according to the downlink transmission parameters, and a central frequency of the subcarrier in the subcarrier reservation location is the same as the local oscillator frequency, set by the UE, of the receiver.

In a first possible implementation manner of the sixth aspect, the processor is configured to acquire the downlink transmission parameters; and when the quantity of resource blocks is an odd number, the antenna port is any one of Ports 0 to 3, and the cell-specific frequency shift value is 1 or 4, shift the local oscillator frequency of the receiver from a central location of the downlink transmission bandwidth to a low frequency or a high frequency by half a subcarrier; or when the quantity of resource blocks is an odd number, the antenna port is any one of Ports 0 to 3, and the cell-specific frequency shift value is 0 or 3, shift the local oscillator frequency of the receiver from a central location of the downlink transmission bandwidth to a low frequency by half a subcarrier; or when the quantity of resource blocks is an odd number, the antenna port is any one of Ports 0 to 3, and the cell-specific frequency shift value is 2 or 5, shift the local oscillator frequency of the receiver from a central location of the downlink transmission bandwidth to a high frequency by half a subcarrier.

In a second possible implementation manner of the sixth aspect, the processor is configured to acquire the downlink transmission parameters; and when the quantity of resource blocks is an odd number, the antenna port is Port 5, the CP type is a normal CP, and the cell-specific frequency shift value is 0 or 2, shift the local oscillator frequency of the receiver from a central location of the downlink transmission bandwidth to a low frequency by half a subcarrier; or when the quantity of resource blocks is an odd number, the antenna port is Port 5, the CP type is a normal CP, and the cell-specific frequency shift value is 1, shift the local oscillator frequency of the receiver from a central location of the downlink transmission bandwidth to a high frequency by half a subcarrier; or when the quantity of resource blocks is an odd number, the antenna port is Port 5, the CP type is an extended CP, and the cell-specific frequency shift value is 0, shift the local oscillator frequency of the receiver from a central location of the downlink transmission bandwidth to a high frequency or a low frequency by 1.5 subcarriers, or when the quantity of resource blocks is an odd number, the antenna port is Port 5, the CP type is an extended CP, and the cell-specific frequency shift value is 1, shift the local oscillator frequency of the receiver from a central location of the downlink transmission bandwidth to a low frequency by half a subcarrier, or when the quantity of resource blocks is an odd number, the antenna port is Port 5, the CP type is an extended CP, and the cell-specific frequency shift value is 2, shift the local oscillator frequency of the receiver from a central location of the downlink transmission bandwidth to a high frequency by half a subcarrier.

In a third possible implementation manner of the sixth aspect, the processor is configured to acquire the downlink transmission parameters; and when the quantity of resource blocks is an odd number, the CP type is a normal CP, and the antenna port is one or more of Ports 7, 8, 11, and 13, set, by the UE, the local oscillator frequency of the receiver to be in a location in which the fifth subcarrier of a resource block located at a center of the downlink transmission bandwidth is located; or when the quantity of resource blocks is an odd number, the CP type is a normal CP, and the antenna port is one or more of Ports 9, 10, 12, and 14, set, by the UE, the local oscillator frequency of the receiver to be in a location in which the sixth subcarrier of a resource block located at a center of the downlink transmission bandwidth is located; or when the quantity of resource blocks is an odd number, the CP type is an extended CP, and the antenna port is Port 7 or Port 8, set, by the UE, the local oscillator frequency of the receiver to be in a location in which the fifth or sixth subcarrier of a resource block located at a center of the downlink transmission bandwidth is located.

In a fourth possible implementation manner of the sixth aspect, the processor is configured to acquire the downlink transmission parameters; and when the quantity of resource blocks is an even number, set the local oscillator frequency of the receiver to be between a first resource block and a second resource block, where the first resource block and the second block resource are two adjacent resource blocks that are located at a center of the downlink transmission bandwidth, and a frequency at which the first resource block is located is higher than a frequency at which the second resource block is located.

In a fifth possible implementation manner of the sixth aspect, the processor is configured to acquire the downlink transmission parameters; and when the quantity of resource blocks is an even number and the downlink transmission bandwidth covers a system direct current, set the local oscillator frequency of the receiver to be in a central location of a first resource block or a central location of a second resource block, where the first resource block and the second block resource are two adjacent resource blocks that are located at a center of the downlink transmission bandwidth, and a frequency at which the first resource block is located is higher than a frequency at which the second resource block is located.

With reference to the sixth aspect or any one of the possible implementation manners of the sixth aspect, in a sixth possible implementation manner, the radio frequency module is configured to discard a CRS RE interfered by an MTC direct current.

According to the embodiments of the present disclosure, in a process of transmitting MTC downlink data, a base station sends the MTC downlink data after discarding a subcarrier, and a UE resets a local oscillator frequency of a receiver according to downlink transmission parameters of MTC data, so as to complete correct reception of the data, thereby preventing a new direct current introduced due to narrow band radio frequency reception of the UE from affecting accurate reception of a subcarrier nearby the direct current.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

According to the embodiments of the present disclosure, in a process of transmitting MTC downlink data, a base station sends the MTC downlink data after reserving a subcarrier, and a UE resets a local oscillator frequency of a receiver according to downlink transmission parameters of MTC data, so as to complete correct reception of the data, thereby preventing a new direct current introduced due to narrow band radio frequency reception of the UE from affecting accurate reception of data on a subcarrier nearby the direct current.

The foregoing local oscillator frequency of the receiver is a carrier frequency signal locally generated by the receiver. The carrier frequency signal is used to demodulate a signal that is received by the receiver and that is modulated by using a carrier.

Figure 1:
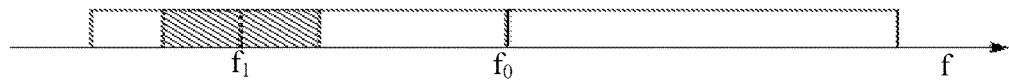
FIG. 1 is a schematic diagram of a location of a direct current generated because a UE uses narrow band radio frequency reception.
Figure 2:
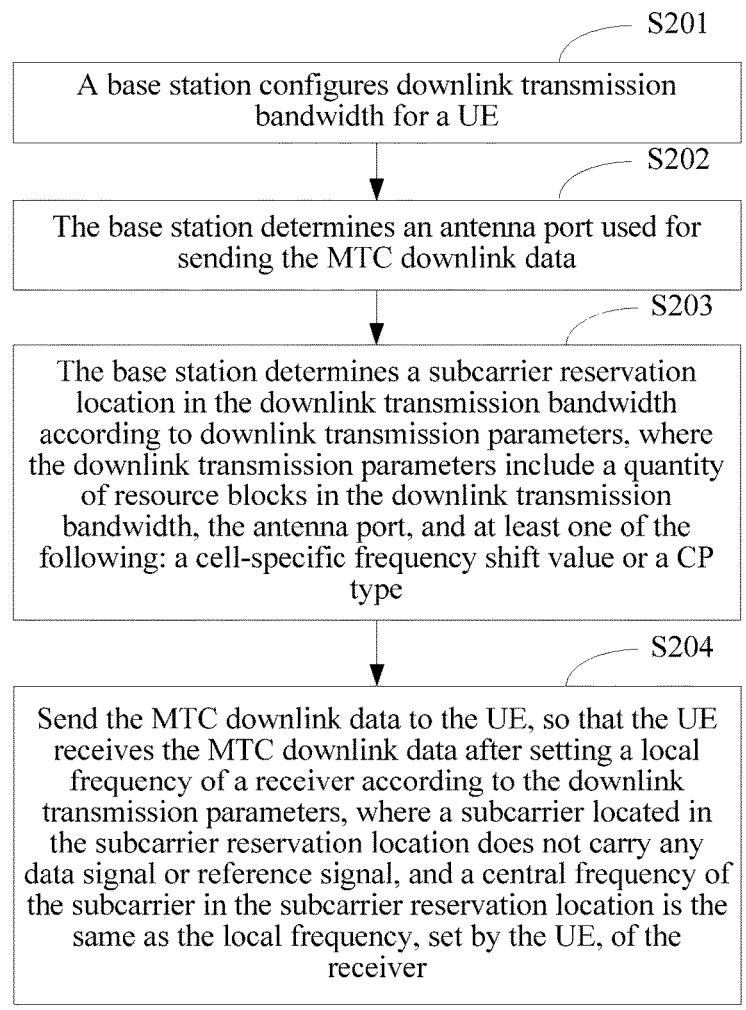
FIG. 2 is a flowchart of implementing a method for sending MTC downlink data according to an embodiment of the present disclosure.

FIG. 2 shows a procedure of implementing a method for sending MTC downlink data according to an embodiment of the present disclosure. In this embodiment, the procedure is executed by a base station. A detailed description is as follows. In step S201, the base station configures downlink transmission bandwidth for a UE.

Figure 3:
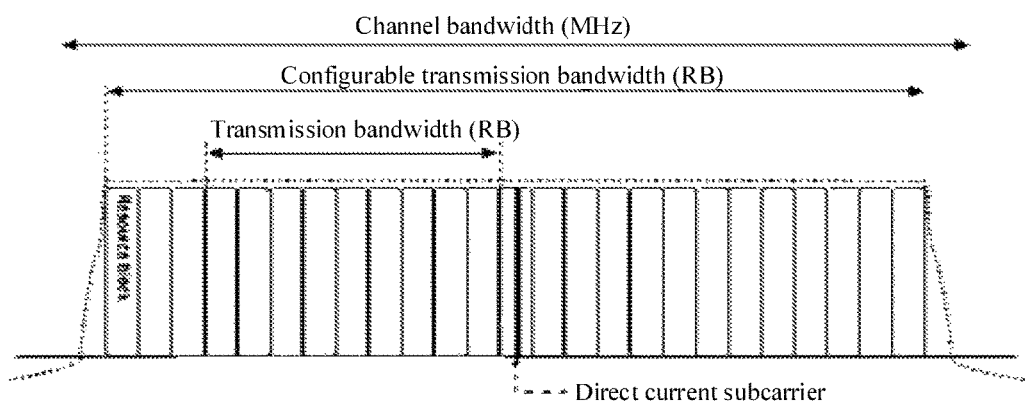
FIG. 3 is schematic diagram of a location relationship between channel bandwidth and system transmission bandwidth.

Channel bandwidth of an LTE system may be 1.4 MHz, 3 MHz, 5 MHz, 10 MHz, 20 MHz, or the like. Transmission bandwidth that is of the LTE system and that is corresponding to the foregoing channel bandwidth is separately 6, 15, 25, 50, or 100 resource blocks, or the like. A location relationship between the foregoing channel bandwidth and transmission bandwidth is shown in FIG. 3, where a horizontal coordinate represents system bandwidth. In this embodiment, before sending MTC downlink data to the UE, the base station configures the downlink transmission bandwidth of the UE according to downlink channel bandwidth configured for the UE, and determines a quantity of resource blocks in the downlink transmission bandwidth.

In step S202, the base station determines an antenna port used for sending the MTC downlink data.

The LTE system uses multiple antennas for transmission. Therefore, when sending the MTC downlink data, the base station may determine the antenna port used for sending the MTC downlink data. The base station may map, according to a related LTE physical layer protocol, the currently sent MTC downlink data to an antenna port corresponding to content of the data, thereby determining the antenna port used for sending the MTC downlink data.

In step S203, the base station determines a subcarrier reservation location in the downlink transmission bandwidth according to downlink transmission parameters, where the downlink transmission parameters include a quantity of resource blocks in the downlink transmission bandwidth, the antenna port, and at least one of the following: a cell-specific frequency shift value or a CP type.

In this embodiment, in order to ensure that a downlink reception process of a receiver of the UE is not affected by an MTC direct current generated by the receiver, the base station needs to determine, in a location in which the MTC direct current is generated or nearby the location, one subcarrier reservation location in the downlink transmission bandwidth. A subcarrier sent in the subcarrier reservation location is neither used to send the MTC downlink data, nor used to carry a reference signal that is used by the receiver to demodulate received data. Therefore, in the downlink reception process, impact exerted by the MTC direct current on the subcarrier does not affect a result of entire downlink reception.

In this embodiment of the present disclosure, the subcarrier reservation location is used to determine a subcarrier. The subcarrier reservation location may be a central frequency of the subcarrier, or may be a frequency range of the subcarrier, which is not limited in the present disclosure.

In this embodiment, a location in which a local oscillator frequency of the receiver generating the MTC direct current is set to be in a middle location of the downlink transmission bandwidth, or is set to be nearby a middle location of the downlink transmission bandwidth. Therefore, the quantity of resource blocks in the downlink transmission bandwidth that is configured by the base station for the UE needs to be considered for determining the subcarrier reservation location. In addition, reference signals in different distribution forms are configured on different antenna ports, and the subcarrier sent in the subcarrier reservation location shall not include a reference signal. Therefore, the antenna port used for sending the MTC downlink data also needs to be considered for determining the subcarrier reservation location.

In addition, different cell-specific frequency shift values are configured for adjacent cells, so that reference signals sent to the cells are in different distribution forms, and the reference signals are not mutually interfered between the cells. Therefore, the cell-specific frequency shift value is also one of factors affecting reference signal distribution. Moreover, the CP type determines a quantity of resource elements of a subframe on a time axis, and a resource element is a smallest unit for sending a data signal or a reference signal. Therefore, the CP type is also one of the factors affecting reference signal distribution. Therefore, in some cases, the cell-specific frequency shift value or the CP type also needs to be considered for determining the subcarrier reservation location, and specific cases are described in detail in subsequent embodiments.

In step S204, the base station sends the MTC downlink data to the UE, so that the UE receives the MTC downlink data after setting a local oscillator frequency of a receiver according to the downlink transmission parameters, where a subcarrier located in the subcarrier reservation location does not carry any data signal or reference signal, and a central frequency of the subcarrier in the subcarrier reservation location is the same as the local oscillator frequency, set by the UE, of the receiver.

In this embodiment, when the base station sends modulated MTC downlink data, the subcarrier located in the subcarrier reservation location does not carry any data signal or reference signal. Moreover, when the UE receives the MTC downlink data sent by the base station, the UE also obtains a same subcarrier reservation location according to the downlink transmission parameters, and sets the local oscillator frequency of the receiver of the UE to be in the subcarrier reservation location. Therefore, an MTC direct current generated by the receiver of the UE is also located on the subcarrier, thereby preventing the MTC direct current generated by the receiver from affecting a result of receiving the MTC downlink data by the UE.

It should be noted that in this embodiment of the present disclosure, the subcarrier in the subcarrier reservation location refers to a subcarrier whose central frequency is located in the subcarrier reservation location, which is not repeatedly described in the subsequent embodiments.

Figure 4:
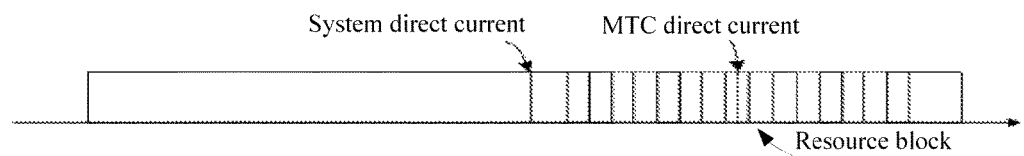
FIG. 4 is a schematic diagram of a location of an MTC direct current when a quantity of resource blocks is an odd number according to an embodiment of the present disclosure.

Next, based on the foregoing principle, the determining a subcarrier reservation location according to downlink transmission parameters is detailed according to various cases. In case 1 to case 3, the quantity of resource blocks is an odd number. As shown in FIG. 4, when the quantity of resource blocks is an odd number, a reference location of the local oscillator frequency of the receiver of the UE is at a center of an MTC resource configured by the base station for the UE. Because one resource block includes 12 subcarriers, the reference location of the local oscillator frequency of the receiver is actually located at a center of one resource block, that is, between two subcarriers.

Case 1. When the quantity of resource blocks in the downlink transmission bandwidth is an odd number and the antenna port is any one of Ports 0 to 3, the downlink transmission parameters further include the cell-specific frequency shift value. The cell-specific frequency shift value is obtained according to $v_{shift}=N_{ID}^{cell} \mod 6$, where $v_{shift}$ is the cell-specific frequency shift value, and $N_{ID}^{cell}$ is a cell identity.

When the cell-specific frequency shift value is 1 or 4, the base station determines a location in which the fifth or sixth subcarrier of a resource block located at a center of the downlink transmission bandwidth is located, as the subcarrier reservation location, where it should be noted that in this embodiment of the present disclosure, 12 subcarriers in one resource block are numbered, in ascending order of frequencies at which the subcarriers are located, in sequence starting from 0, which is not described again in the subsequent embodiments, when the cell-specific frequency shift value is 0 or 3, the base station determines a location in which the fifth subcarrier of a resource block located at a center of the downlink transmission bandwidth is located, as the subcarrier reservation location, or when the cell-specific frequency shift value is 2 or 5, the base station determines a location in which the sixth subcarrier of a resource block located at a center of the downlink transmission bandwidth is located, as the subcarrier reservation location.

Case 2. When the quantity of resource blocks in the downlink transmission bandwidth is an odd number and the antenna port is Port 5, the downlink transmission parameters further include the cell-specific frequency shift value and a CP type that is used by the base station, if the CP type that is used by the base station is a normal CP when the cell-specific frequency shift value is 0 or 2, the base station determines a location in which the fifth subcarrier of a resource block located at a center of the downlink transmission bandwidth is located, as the subcarrier reservation location, or when the cell-specific frequency shift value is 1, the base station determines a location in which the sixth subcarrier of a resource block located at a center of the downlink transmission bandwidth is located, as the subcarrier reservation location, or if the CP type that is used by the base station is an extended CP when the cell-specific frequency shift value is 0, the base station determines a location in which the fourth or seventh subcarrier of a resource block located at a center of the downlink transmission bandwidth is located, as the subcarrier reservation location, when the cell-specific frequency shift value is 1, the base station determines a location in which the fifth subcarrier of a resource block located at a center of the downlink transmission bandwidth is located, as the subcarrier reservation location, or when the cell-specific frequency shift value is 2, the base station determines a location in which the sixth subcarrier of a resource block located at a center of the downlink transmission bandwidth is located, as the subcarrier reservation location.

Case 3. When the quantity of resource blocks in the downlink transmission bandwidth is an odd number, the downlink transmission parameters further include a CP type that is used by the base station, if the CP type that is used by the base station is a normal CP when the antenna port is one or more of Ports 7, 8, 11, and 13, the base station determines a location in which the fifth subcarrier of a resource block located at a center of the downlink transmission bandwidth is located, as the subcarrier reservation location, or when the antenna port is one or more of Ports 9, 10, 12, and 14, the base station determines a location in which the sixth subcarrier of a resource block located at a center of the downlink transmission bandwidth is located, as the subcarrier reservation location, or if the CP type that is used by the base station is an extended CP when the antenna port is Port 7 or Port 8, the base station determines a location in which the fifth or sixth subcarrier of a resource block located at a center of the downlink transmission bandwidth is located, as the subcarrier reservation location.

It should be noted that, for Ports 7 to 14, if multi-layer transmission (that is, multiple independent data streams are transmitted at the same time, where all the multiple independent data streams use a same frequency resource but different space resources) needs to be supported, the base station may select antenna ports in one set to send the MTC downlink data, where a first set includes Ports 7, 8, 11, and 13, and a second set includes Ports 9, 10, 12, and 14, thereby avoiding a case in which subcarrier reservation locations in downlink signals received by the UE are different when antenna ports separately from the two sets are used for sending.

Figure 5:
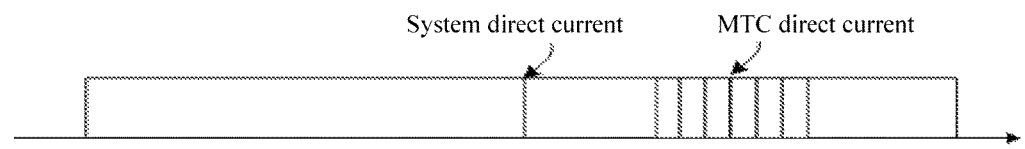
FIG. 5 is a schematic diagram of a location of an MTC direct current when a quantity of resource blocks is an even number according to an embodiment of the present disclosure.

In case 4 to case 6, the quantity of resource blocks in the downlink transmission bandwidth is an even number. As shown in FIG. 5, when the quantity of resource blocks is an even number, the local oscillator frequency of the receiver of the UE is set to be between a first resource block and a second resource block, where the first resource block and the second resource block are two adjacent resource blocks that are located at a center of the downlink transmission bandwidth, and a frequency at which the first resource block is located is higher than a frequency at which the second resource block is located.

Case 4. When the quantity of resource blocks in the downlink transmission bandwidth is an even number and the antenna port is any one of Ports 0 to 3, the downlink transmission parameters further include the cell-specific frequency shift value, when the cell-specific frequency shift value is 1 or 4, the base station determines a location in which the eleventh subcarrier of a first resource block or the zeroth subcarrier of a second resource block is located, as the subcarrier reservation location, when the cell-specific frequency shift value is 0 or 3, the base station determines a location in which the eleventh subcarrier of a first resource block is located, as the subcarrier reservation location, or when the cell-specific frequency shift value is 2 or 5, the base station determines a location in which the zeroth subcarrier of a second resource block is located, as the subcarrier reservation location.

Case 5. When the quantity of resource blocks in the downlink transmission bandwidth is an even number and the antenna port is Port 5, the downlink transmission parameters further include the cell-specific frequency shift value and a CP type that is used by the base station, if the CP type that is used by the base station is a normal CP when the cell-specific frequency shift value is 0 or 2, the base station determines a location in which the eleventh subcarrier of a first resource block is located, as the subcarrier reservation location, or when the cell-specific frequency shift value is 1, the base station determines a location in which the zeroth subcarrier of a second resource block is located, as the subcarrier reservation location, or if the CP type that is used by the base station is an extended CP when the cell-specific frequency shift value is 0, the base station determines a location in which the tenth subcarrier of a first resource block or the first subcarrier of a second resource block is located, as the subcarrier reservation location, when the cell-specific frequency shift value is 1, the base station determines a location in which the eleventh subcarrier of a first resource block is located, as the subcarrier reservation location, or when the cell-specific frequency shift value is 2, the base station determines a location in which the zeroth subcarrier of a second resource block is located, as the subcarrier reservation location.

Case 6. When the quantity of resource blocks in the downlink transmission bandwidth is an even number, the downlink transmission parameters further include a CP type that is used by the base station, if the CP type that is used by the base station is a normal CP when the antenna port is one or more of Ports 7, 8, 11, and 13, the base station determines a location in which the zeroth subcarrier of a second resource block is located, as the subcarrier reservation location, or when the antenna port is one or more of Ports 9, 10, 12, and 14, the base station determines a location in which the eleventh subcarrier of a first resource block is located, as the subcarrier reservation location, or if the CP type that is used by the base station is an extended CP when the antenna port is Port 7 or Port 8, the base station determines a location in which the zeroth subcarrier of a second resource block or the eleventh subcarrier of a first resource block is located, as the subcarrier reservation location.

As an embodiment of the present disclosure, when the UE receives an ePDCCH and a PDSCH through Ports 7 to 14, the base station may select antenna ports in one set for the ePDCCH and PDSCH, where a first set includes Ports 7, 8, 11, and 13, and a second set includes Ports 9, 10, 12, and 14, thereby avoiding a reception failure of the UE because received downlink signals include different subcarrier reservation locations.

The base station configures, among the antenna ports Ports 7, 8, 11, and 13, the antenna port for the ePDCCH and the PDSCH, or the base station configures, among the antenna ports Ports 9, 10, 12, and 14, the antenna port for the ePDCCH and the PDSCH.

It should be noted that in the foregoing six cases, when there are multiple optional subcarrier reservation locations, interference to a CRS RE may be avoided as far as possible to implement synchronization.

In this embodiment of the present disclosure, when the base station sends the MTC downlink data in step S204, according to an agreement, the base station does not send any data signal or reference signal on the subcarrier located in the subcarrier reservation location, and the UE does not consider related data REs on the subcarrier either during reception, thereby depending on coding and decoding processing. Although approximately 10 data REs are lost, correct reception can also be complete to some extent.

Figure 6:
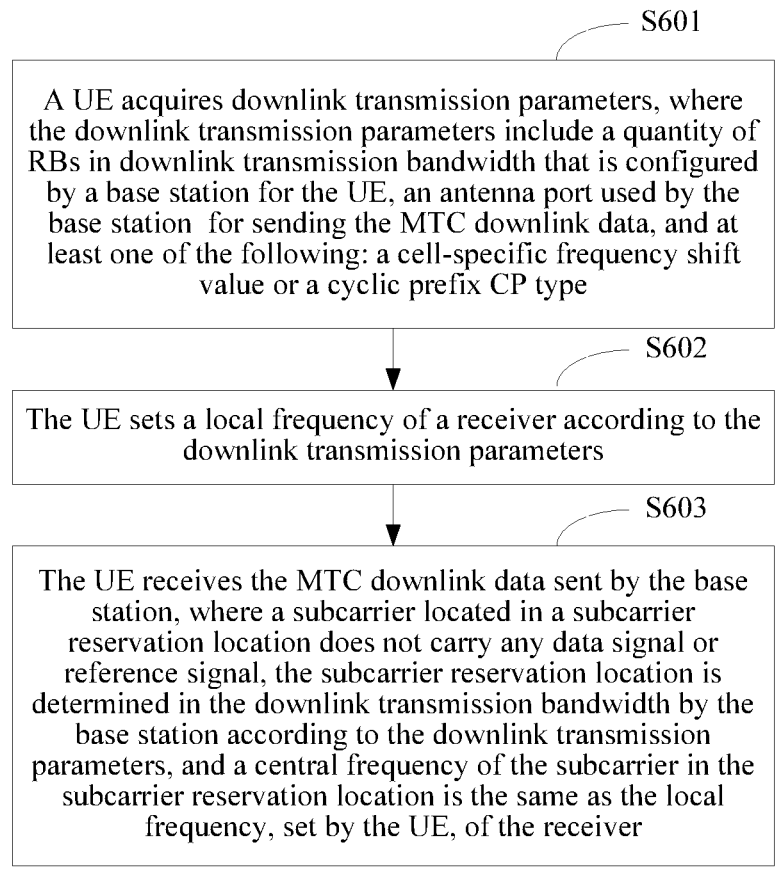
FIG. 6 is a flowchart of implementing a method for receiving MTC downlink data according to an embodiment of the present disclosure.

FIG. 6 shows a procedure of implementing a method for receiving MTC downlink data according to an embodiment of the present disclosure. A detailed description is as follows In step S601, a UE acquires downlink transmission parameters, where the downlink transmission parameters include a quantity of resource blocks in downlink transmission bandwidth that is configured by a base station for the UE, an antenna port used by the base station for sending the MTC downlink data, and at least one of the following: a cell-specific frequency shift value or a CP type.

In step S602, the UE sets a local oscillator frequency of a receiver according to the downlink transmission parameters.

In step S603, the UE receives the MTC downlink data sent by the base station, where a subcarrier that is in a subcarrier reservation location and that is sent by the base station does not carry any data signal or reference signal, the subcarrier reservation location is determined in the downlink transmission bandwidth by the base station according to the downlink transmission parameters, and a central frequency of the subcarrier in the subcarrier reservation location is the same as the local oscillator frequency, set by the UE, of the receiver.

In this embodiment, the UE sets the local oscillator frequency of the receiver according to the downlink transmission parameters. After receiving the MTC downlink data sent by the base station, the UE may ignore an RE in the subcarrier reservation location in the following manners. 1. The UE tolerates existing interference, and may complete correct reception to some extent depending on coding and decoding processing.

2. The UE actively discards a data RE related to a subcarrier at which the local oscillator frequency of the receiver is located. Moreover, during decoding, the UE fills a false value for the discarded data RE according to an algorithm, which is equivalent to that the discarded data RE is interfered, and depending on coding and decoding processing, correct reception may be completed to some extent.

It should be noted that, in addition to the foregoing manners, the UE may also make an agreement with the base station that no data is sent in the subcarrier reservation location. During reception, the UE does not consider a related data RE on the subcarrier either and depends on coding and decoding processing. Although approximately 10 data REs are lost, correct reception may also be complete to some extent.

Next, corresponding to the foregoing case 1 to case 6, the setting a local oscillator frequency of a receiver according to the downlink transmission parameters is detailed according to various cases.

Corresponding to the foregoing case 1, when the quantity of resource blocks in the downlink transmission bandwidth is an odd number and the antenna port is any one of Ports 0 to 3, the downlink transmission parameters further include the cell-specific frequency shift value; when the cell-specific frequency shift value is 1 or 4, the UE shifts the local oscillator frequency of the receiver from a central location of the downlink transmission bandwidth to a low frequency or a high frequency by half a subcarrier, when the cell-specific frequency shift value is 0 or 3, the UE shifts the local oscillator frequency of the receiver from a central location of the downlink transmission bandwidth to a low frequency by half a subcarrier, or when the cell-specific frequency shift value is 2 or 5, the UE shifts the local oscillator frequency of the receiver from a central location of the downlink transmission bandwidth to a high frequency by half a subcarrier.

Corresponding to the foregoing case 2, when the quantity of resource blocks in the downlink transmission bandwidth is an odd number and the antenna port is Port 5, the downlink transmission parameters further include the cell-specific frequency shift value and the CP type that is used by the base station; if the CP type that is used by the base station is a normal CP when the cell-specific frequency shift value is 0 or 2, the UE shifts the local oscillator frequency of the receiver from a central location of the downlink transmission bandwidth to a low frequency by half a subcarrier, or when the cell-specific frequency shift value is 1, the UE shifts the local oscillator frequency of the receiver from a central location of the downlink transmission bandwidth to a high frequency by half a subcarrier, or if the CP type that is used by the base station is an extended CP when the cell-specific frequency shift value is 0, the UE shifts the local oscillator frequency of the receiver from a central location of the downlink transmission bandwidth to a high frequency or a low frequency by 1.5 subcarriers, when the cell-specific frequency shift value is 1, the UE shifts the local oscillator frequency of the receiver from a central location of the downlink transmission bandwidth to a low frequency by half a subcarrier, or when the cell-specific frequency shift value is 2, the UE shifts the local oscillator frequency of the receiver from a central location of the downlink transmission bandwidth to a high frequency by half a subcarrier.

Preferably, in case 2, when the UE needs to keep downlink synchronization by using a CRS, if a CRS RE is interfered by an MTC direct current, the UE may discard the CRS RE interfered by the MTC direct current. For example, when the CP type is an extended CP and the cell-specific frequency shift value is 0, if a CRS RE is interfered, the interfered CRS RE is discarded.

Corresponding to the foregoing case 3, when the quantity of resource blocks in the downlink transmission bandwidth is an odd number, the downlink transmission parameters further include the cell-specific frequency shift value and the CP type that is used by the base station; if the CP type is a normal CP when the antenna port is one or more of Ports 7, 8, 11, and 13, the UE sets the local oscillator frequency of the receiver to be in a location in which the fifth subcarrier of a resource block located at a center of the downlink transmission bandwidth is located, or when the antenna port is one or more of Ports 9, 10, 12, and 14, the UE sets the local oscillator frequency of the receiver to be in a location in which the sixth subcarrier of a resource block located at a center of the downlink transmission bandwidth is located, or if the CP type is an extended CP when the antenna port is Port 7 or Port 8, the UE sets the local oscillator frequency of the receiver to be in a location in which the fifth or sixth subcarrier of a resource block located at a center of the downlink transmission bandwidth is located.

Preferably, in case 3, when the antenna port is one or more of Ports 7, 8, 11, and 13, and the cell-specific frequency shift value is 2 or 5, or when the antenna port is one or more of Ports 9, 10, 12, and 14, and the cell-specific frequency shift value is 0 or 3, the UE discards a CRS RE interfered by an MTC direct current.

Corresponding to the foregoing cases 4 to 6, the quantity of resource blocks in the downlink transmission bandwidth is an even number, the UE shifts the local oscillator frequency of the receiver to be between a first resource block and a second resource block, where the first resource block and the second block resource are two adjacent resource blocks that are located at a center of the downlink transmission bandwidth, and a frequency at which the first resource block is located is higher than a frequency at which the second resource block is located.

In addition, when the quantity of resource blocks in the downlink transmission bandwidth is an even number, and the downlink transmission bandwidth that is configured by the base station for the MTC downlink data covers a system direct current, the setting, by the UE, a local oscillator frequency of a receiver according to the downlink transmission parameters is setting, by the UE, the local oscillator frequency of the receiver to be in a central location of a first resource block or a central location of a second resource block.

According to this embodiment of the present disclosure, in a process of transmitting MTC downlink data, a base station sends the MTC downlink data after reserving a subcarrier, and a UE resets a local oscillator frequency of a receiver according to downlink transmission parameters of MTC data, so as to complete correct reception of the data, thereby preventing a new direct current introduced due to narrow band radio frequency reception of the UE from affecting accurate reception of a subcarrier nearby the direct current.

Figure 7:
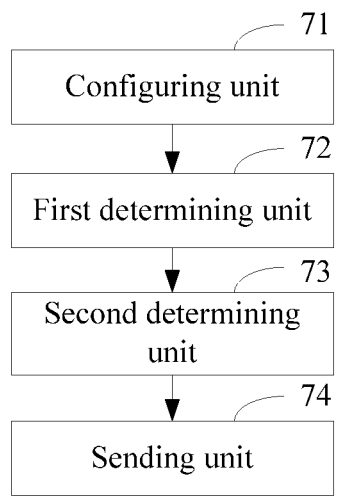
FIG. 7 is a structural block diagram of an apparatus for sending MTC downlink data according to an embodiment of the present disclosure.

FIG. 7 is a structural block diagram of a base station according to an embodiment of the present disclosure. The base station may be configured to run the method for sending MTC downlink data according to the embodiments shown in FIG. 2 to FIG. 5 of the present disclosure. For ease of description, only parts related to this embodiment are shown.

Referring to FIG. 7, the base station includes a configuring unit 71 configured to configure downlink transmission bandwidth for a UE, a first determining unit 72 configured to determine an antenna port used for sending the MTC downlink data, a second determining unit 73 configured to determine a subcarrier reservation location in the downlink transmission bandwidth according to downlink transmission parameters, where the downlink transmission parameters include a quantity of resource blocks in the downlink transmission bandwidth configured by the configuring unit 71, the antenna port determined by the first determining unit 72, and at least one of the following: a cell-specific frequency shift value or a CP type, and a sending unit 74 configured to configured to acquire the subcarrier reservation location determined by the second determining unit 73, and send the MTC downlink data to the UE, so that the UE receives the MTC downlink data after setting a local oscillator frequency of a receiver according to the downlink transmission parameters, where a subcarrier located in the subcarrier reservation location does not carry any data signal or reference signal, and a central frequency of the subcarrier in the subcarrier reservation location is the same as the local oscillator frequency, set by the UE, of the receiver.

Optionally, when the quantity of resource blocks is an odd number and the antenna port is any one of Ports 0 to 3, the downlink transmission parameters further include the cell-specific frequency shift value, and the second determining unit 73 is configured to, when the cell-specific frequency shift value is 1 or 4, determine a location in which the fifth or sixth subcarrier of a resource block located at a center of the downlink transmission bandwidth is located, as the subcarrier reservation location, when the cell-specific frequency shift value is 0 or 3, determine a location in which the fifth subcarrier of a resource block located at a center of the downlink transmission bandwidth is located, as the subcarrier reservation location, or when the cell-specific frequency shift value is 2 or 5, determine a location in which the sixth subcarrier of a resource block located at a center of the downlink transmission bandwidth is located, as the subcarrier reservation location.

Optionally, when the quantity of resource blocks is an odd number and the antenna port is Port 5, the downlink transmission parameters further include the cell-specific frequency shift value and the CP type, and the second determining unit 73 is configured to, if the CP type is a normal CP when the cell-specific frequency shift value is 0 or 2, determine a location in which the fifth subcarrier of a resource block located at a center of the downlink transmission bandwidth is located, as the subcarrier reservation location, or when the cell-specific frequency shift value is 1, determine a location in which the sixth subcarrier of a resource block located at a center of the downlink transmission bandwidth is located, as the subcarrier reservation location, or if the CP type is an extended CP when the cell-specific frequency shift value is 0, determine a location in which the fourth or seventh subcarrier of a resource block located at a center of the downlink transmission bandwidth is located, as the subcarrier reservation location, when the cell-specific frequency shift value is 1, determine a location in which the fifth subcarrier of a resource block located at a center of the downlink transmission bandwidth is located, as the subcarrier reservation location, or when the cell-specific frequency shift value is 2, determine a location in which the sixth subcarrier of a resource block located at a center of the downlink transmission bandwidth is located, as the subcarrier reservation location.

Optionally, when the quantity of resource blocks is an odd number, the downlink transmission parameters further include the CP type, and the second determining unit 73 is configured to, if the CP type is a normal CP when the antenna port is one or more of Ports 7, 8, 11, and 13, determine a location in which the fifth subcarrier of a resource block located at a center of the downlink transmission bandwidth is located, as the subcarrier reservation location, or when the antenna port is one or more of Ports 9, 10, 12, and 14, determine a location in which the sixth subcarrier of a resource block located at a center of the downlink transmission bandwidth is located, as the subcarrier reservation location, or if the CP type is an extended CP when the antenna port is Port 7 or Port 8, determine a location in which the fifth or sixth subcarrier of a resource block located at a center of the downlink transmission bandwidth is located, as the subcarrier reservation location.

Optionally, when the quantity of resource blocks is an even number and the antenna port is any one of Ports 0 to 3, the downlink transmission parameters further include the cell-specific frequency shift value, and the second determining unit 73 is configured to when the cell-specific frequency shift value is 1 or 4, determine a location in which the eleventh subcarrier of a first resource block or the zeroth subcarrier of a second resource block is located, as the subcarrier reservation location, when the cell-specific frequency shift value is 0 or 3, determine a location in which the eleventh subcarrier of a first resource block is located, as the subcarrier reservation location, or when the cell-specific frequency shift value is 2 or 5, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

Optionally, when the quantity of resource blocks is an even number and the antenna port is Port 5, the downlink transmission parameters further include the cell-specific frequency shift value and the CP type, and the second determining unit 73 is configured to if the CP type is a normal CP when the cell-specific frequency shift value is 0 or 2, determine a location in which the eleventh subcarrier of a first resource block is located, as the subcarrier reservation location, or when the cell-specific frequency shift value is 1, determine a location in which the zeroth subcarrier of a second resource block is located, as the subcarrier reservation location, or if the CP type is an extended CP when the cell-specific frequency shift value is 0, determine a location in which the tenth subcarrier of a first resource block or the first subcarrier of a second resource block is located, as the subcarrier reservation location, when the cell-specific frequency shift value is 1, determine a location in which the eleventh subcarrier of a first resource block is located, as the subcarrier reservation location, or when the cell-specific frequency shift value is 2, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

Optionally, when the quantity of resource blocks is an even number, the downlink transmission parameters further include the CP type, and the second determining unit 73 is configured to, if the CP type is a normal CP when the antenna port is one or more of Ports 7, 8, 11, and 13, determine a location in which the zeroth subcarrier of a second resource block is located, as the subcarrier reservation location, or when the antenna port is one or more of Ports 9, 10, 12, and 14, determine a location in which the eleventh subcarrier of a first resource block is located, as the subcarrier reservation location, or if the CP type is an extended CP when the antenna port is Port 7 or Port 8, determine a location in which the zeroth subcarrier of a second resource block or the eleventh subcarrier of a first resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

Optionally, the sending unit 74 is configured to configure, among the antenna ports Ports 7, 8, 11, and 13, the antenna port for an ePDCCH and a PDSCH, or configure, among the antenna ports Ports 9, 10, 12, and 14, the antenna port for an ePDCCH and a PDSCH.

Optionally, the base station supports multi-layer transmission, and the sending unit 74 is configured to configure, among the antenna ports Ports 7, 8, 11, and 13, the antenna port for the UE, or configure, among the antenna ports Ports 9, 10, 12, and 14, the antenna port for the UE.

Figure 8:
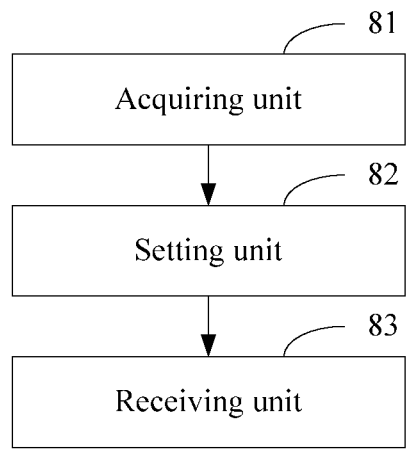
FIG. 8 is a structural block diagram of an apparatus for receiving MTC downlink data according to an embodiment of the present disclosure.

FIG. 8 is a structural block diagram of a UE according to an embodiment of the present disclosure. The UE may be configured to run the method for receiving MTC downlink data according to the embodiment shown in FIG. 6 of the present disclosure. For ease of description, only parts related to this embodiment are shown.

Referring to FIG. 8, the UE includes an acquiring unit 81 configured to acquire downlink transmission parameters, where the downlink transmission parameters include a quantity of resource blocks in downlink transmission bandwidth that is configured by a base station for the UE, an antenna port used by the base station for sending the MTC downlink data, and at least one of the following: a cell-specific frequency shift value or a CP type, a setting unit 82 configured to set a local oscillator frequency of a receiver according to the downlink transmission parameters acquired by the acquiring unit 81, and a receiving unit 83 configured to receive, by the UE, the MTC downlink data sent by the base station, where a subcarrier located in a subcarrier reservation location does not carry any data signal or reference signal, the subcarrier reservation location is determined in the downlink transmission bandwidth by the base station according to the downlink transmission parameters, and a central frequency of the subcarrier in the subcarrier reservation location is the same as the local oscillator frequency, set by the UE, of the receiver.

Optionally, when the quantity of resource blocks is an odd number and the antenna port is any one of Ports 0 to 3, the downlink transmission parameters further include the cell-specific frequency shift value, and the setting unit 82 is configured to when the cell-specific frequency shift value is 1 or 4, shift the local oscillator frequency of the receiver from a central location of the downlink transmission bandwidth to a low frequency or a high frequency by half a subcarrier, when the cell-specific frequency shift value is 0 or 3, shift the local oscillator frequency of the receiver from a central location of the downlink transmission bandwidth to a low frequency by half a subcarrier, or when the cell-specific frequency shift value is 2 or 5, shift the local oscillator frequency of the receiver from a central location of the downlink transmission bandwidth to a high frequency by half a subcarrier.

Optionally, when the quantity of resource blocks is an odd number and the antenna port is Port 5, the downlink transmission parameters further include the cell-specific frequency shift value and the CP type, and the setting unit 82 is configured to if the CP type is a normal CP when the cell-specific frequency shift value is 0 or 2, shift the local oscillator frequency of the receiver from a central location of the downlink transmission bandwidth to a low frequency by half a subcarrier, or when the cell-specific frequency shift value is 1, shift the local oscillator frequency of the receiver from a central location of the downlink transmission bandwidth to a high frequency by half a subcarrier, or if the CP type is an extended CP when the cell-specific frequency shift value is 0, shift the local oscillator frequency of the receiver from a central location of the downlink transmission bandwidth to a high frequency or a low frequency by 1.5 subcarriers, when the cell-specific frequency shift value is 1, shift the local oscillator frequency of the receiver from a central location of the downlink transmission bandwidth to a low frequency by half a subcarrier, or when the cell-specific frequency shift value is 2, shift the local oscillator frequency of the receiver from a central location of the downlink transmission bandwidth to a high frequency by half a subcarrier.

Optionally, when the quantity of resource blocks is an odd number, the downlink transmission parameters further include the CP type, and the setting unit 82 is configured to if the CP type is a normal CP when the antenna port is one or more of Ports 7, 8, 11, and 13, set the local oscillator frequency of the receiver to be in a location in which the fifth subcarrier of a resource block located at a center of the downlink transmission bandwidth is located, or when the antenna port is one or more of Ports 9, 10, 12, and 14, set the local oscillator frequency of the receiver to be in a location in which the sixth subcarrier of a resource block located at a center of the downlink transmission bandwidth is located, or if the CP type is an extended CP when the antenna port is Port 7 or Port 8, set the local oscillator frequency of the receiver to be in a location in which the fifth or sixth subcarrier of a resource block located at a center of the downlink transmission bandwidth is located.

Optionally, the quantity of resource blocks is an even number, and the setting unit 82 is configured to set the local oscillator frequency of the receiver to be between a first resource block and a second resource block, where the first resource block and the second resource block are two adjacent resource blocks that are located at a center of the downlink transmission bandwidth, and a frequency at which the first resource block is located is higher than a frequency at which the second resource block is located.

Optionally, the quantity of resource blocks is an even number, the downlink transmission bandwidth covers a system direct current, and the setting unit 82 is configured to set the local oscillator frequency of the receiver to be in a central location of a first resource block or a central location of a second resource block, where the first resource block and the second resource block are two adjacent resource blocks that are located at a center of the downlink transmission bandwidth, and a frequency at which the first resource block is located is higher than a frequency at which the second resource block is located.

Optionally, the receiving unit 83 is configured to discard a CRS RE interfered by an MTC direct current.

Figure 9:
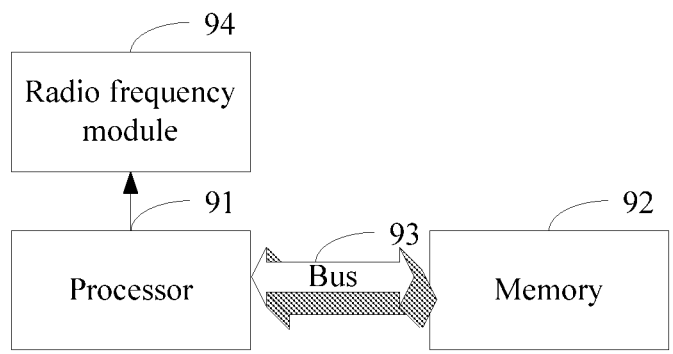
FIG. 9 is a structural block diagram of an apparatus for sending MTC downlink data according to an embodiment of the present disclosure.

FIG. 9 is a structural block diagram of hardware of a base station according to an embodiment of the present disclosure. The base station may be configured to run the method for sending MTC downlink data according to the embodiments shown in FIG. 2 to FIG. 5 of the present disclosure. For ease of description, only parts related to this embodiment are shown.

Referring to FIG. 9, the base station includes a processor 91, a memory 92, a bus 93, and a radio frequency module 94, where the processor 91 and the memory 92 communicate with each other by using the bus 93, the memory 92 is configured to store a program, the processor 91 is configured to execute the program stored in the memory 92, and when the program is executed, the processor 91 is configured to configure downlink transmission bandwidth for a UE, determine an antenna port used for sending the MTC downlink data, and determine a subcarrier reservation location in the downlink transmission bandwidth according to downlink transmission parameters, where the downlink transmission parameters include a quantity of resource blocks in the downlink transmission bandwidth, the antenna port, and at least one of the following: a cell-specific frequency shift value or a CP type, and the radio frequency module 94 is connected to the processor 91 and is configured to send the MTC downlink data to the UE, so that the UE receives the MTC downlink data after setting a local oscillator frequency of a receiver according to the downlink transmission parameters, where a subcarrier located in the subcarrier reservation location does not carry any data signal or reference signal, and a central frequency of the subcarrier in the subcarrier reservation location is the same as the local oscillator frequency, set by the UE, of the receiver.

Optionally, the processor 91 is configured to configure the downlink transmission bandwidth for the UE, determine the antenna port used for sending the MTC downlink data, and when the quantity of resource blocks is an odd number, the antenna port is any one of Ports 0 to 3, and the cell-specific frequency shift value is 1 or 4, determine a location in which the fifth or sixth subcarrier of a resource block located at a center of the downlink transmission bandwidth is located, as the subcarrier reservation location, or when the quantity of resource blocks is an odd number, the antenna port is any one of Ports 0 to 3, and the cell-specific frequency shift value is 0 or 3, determine a location in which the fifth subcarrier of a resource block located at a center of the downlink transmission bandwidth is located, as the subcarrier reservation location, or when the quantity of resource blocks is an odd number, the antenna port is any one of Ports 0 to 3, and the cell-specific frequency shift value is 2 or 5, determine a location in which the sixth subcarrier of a resource block located at a center of the downlink transmission bandwidth is located, as the subcarrier reservation location.

Optionally, the processor 91 is configured to configure the downlink transmission bandwidth for the UE, determine the antenna port used for sending the MTC downlink data, and when the quantity of resource blocks is an odd number, the antenna port is Port 5, the CP type is a normal CP, and the cell-specific frequency shift value is 0 or 2, determine a location in which the fifth subcarrier of a resource block located at a center of the downlink transmission bandwidth is located, as the subcarrier reservation location, or when the quantity of resource blocks is an odd number, the antenna port is Port 5, the CP type is a normal CP, and the cell-specific frequency shift value is 1, determine a location in which the sixth subcarrier of a resource block located at a center of the downlink transmission bandwidth is located, as the subcarrier reservation location, or when the quantity of resource blocks is an odd number, the antenna port is Port 5, the CP type is an extended CP, and the cell-specific frequency shift value is 0, determine a location in which the fourth or seventh subcarrier of a resource block located at a center of the downlink transmission bandwidth is located, as the subcarrier reservation location, or when the quantity of resource blocks is an odd number, the antenna port is Port 5, the CP type is an extended CP, and the cell-specific frequency shift value is 1, determine a location in which the fifth subcarrier of a resource block located at a center of the downlink transmission bandwidth is located, as the subcarrier reservation location, or when the quantity of resource blocks is an odd number, the antenna port is Port 5, the CP type is an extended CP, and the cell-specific frequency shift value is 2, determine a location in which the sixth subcarrier of a resource block located at a center of the downlink transmission bandwidth is located, as the subcarrier reservation location.

Optionally, the processor 91 is configured to configure the downlink transmission bandwidth for the UE, determine the antenna port used for sending the MTC downlink data, and when the quantity of resource blocks is an odd number, the CP type is a normal CP, and the antenna port is one or more of Ports 7, 8, 11, and 13, determine a location in which the fifth subcarrier of a resource block located at a center of the downlink transmission bandwidth is located, as the subcarrier reservation location, or when the quantity of resource blocks is an odd number, the CP type is a normal CP, and the antenna port is one or more of Ports 9, 10, 12, and 14, determine a location in which the sixth subcarrier of a resource block located at a center of the downlink transmission bandwidth is located, as the subcarrier reservation location, or when the quantity of resource blocks is an odd number, the CP type is an extended CP, and the antenna port is Port 7 or Port 8, determine a location in which the fifth or sixth subcarrier of a resource block located at a center of the downlink transmission bandwidth is located, as the subcarrier reservation location.

Optionally, the processor 91 is configured to configure the downlink transmission bandwidth for the UE, determine the antenna port used for sending the MTC downlink data, and when the quantity of resource blocks is an even number, the antenna port is any one of Ports 0 to 3, and the cell-specific frequency shift value is 1 or 4, determine a location in which the eleventh subcarrier of a first resource block or the zeroth subcarrier of a second resource block is located, as the subcarrier reservation location, or when the quantity of resource blocks is an even number, the antenna port is any one of Ports 0 to 3, and the cell-specific frequency shift value is 0 or 3, determine a location in which the eleventh subcarrier of a first resource block is located, as the subcarrier reservation location, or when the quantity of resource blocks is an even number, the antenna port is any one of Ports 0 to 3, and the cell-specific frequency shift value is 2 or 5, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

Optionally, the processor 91 is configured to configure the downlink transmission bandwidth for the UE, determine the antenna port used for sending the MTC downlink data, and when the quantity of resource blocks is an even number, the antenna port is Port 5, the CP type is a normal CP, and the cell-specific frequency shift value is 0 or 2, determine a location in which the eleventh subcarrier of a first resource block is located, as the subcarrier reservation location, or when the quantity of resource blocks is an even number, the antenna port is Port 5, the CP type is a normal CP, and the cell-specific frequency shift value is 1, determine a location in which the zeroth subcarrier of a second resource block is located, as the subcarrier reservation location, or when the quantity of resource blocks is an even number, the antenna port is Port 5, the CP type is an extended CP, and the cell-specific frequency shift value is 0, determine a location in which the tenth subcarrier of a first resource block or the first subcarrier of a second resource block is located, as the subcarrier reservation location, or when the quantity of resource blocks is an even number, the antenna port is Port 5, the CP type is an extended CP, and the cell-specific frequency shift value is 1, determine a location in which the eleventh subcarrier of a first resource block is located, as the subcarrier reservation location, or when the quantity of resource blocks is an even number, the antenna port is Port 5, the CP type is an extended CP, and the cell-specific frequency shift value is 2, determine a location in which the zeroth subcarrier of a second resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

Optionally, the processor 91 is configured to configure the downlink transmission bandwidth for the UE, determine the antenna port used for sending the MTC downlink data, and when the quantity of resource blocks is an even number, the CP type is a normal CP, and the antenna port is one or more of Ports 7, 8, 11, and 13, determine a location in which the zeroth subcarrier of a second resource block is located, as the subcarrier reservation location, or when the quantity of resource blocks is an even number, the CP type is a normal CP, and the antenna port is one or more of Ports 9, 10, 12, and 14, determine a location in which the eleventh subcarrier of a first resource block is located, as the subcarrier reservation location, or when the quantity of resource blocks is an even number, the CP type is an extended CP, and the antenna port is Port 7 or Port 8, determine a location in which the zeroth subcarrier of a second resource block or the eleventh subcarrier of a first resource block is located, as the subcarrier reservation location, where the first resource block and the second resource block are two adjacent resource blocks that are located at a center of the downlink transmission bandwidth, and a frequency at which the first resource block is located is higher than a frequency at which the second resource block is located.

Optionally, the determining the antenna port used for sending the MTC downlink data includes configuring, among the antenna ports Ports 7, 8, 11, and 13, the antenna port for an enhanced physical downlink control channel ePDCCH and a physical downlink shared channel PDSCH, or configuring, among the antenna ports Ports 9, 10, 12, and 14, the antenna port for an ePDCCH and a PDSCH.

Optionally, the base station supports multi-layer transmission, and the determining the antenna port used for sending the MTC downlink data includes configuring, among the antenna ports Ports 7, 8, 11, and 13, the antenna port for the UE, or configuring, among the antenna ports Ports 9, 10, 12, and 14, the antenna port for the UE.

Figure 10:
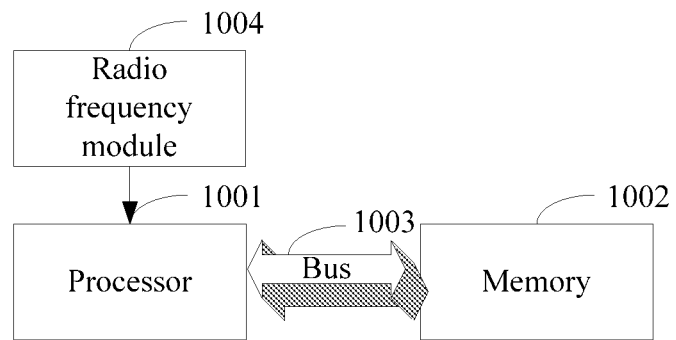
FIG. 10 is a structural block diagram of an apparatus for receiving MTC downlink data according to an embodiment of the present disclosure.

FIG. 10 is a structural block diagram of a UE according to an embodiment of the present disclosure. The UE may be configured to run the method for sending MTC downlink data according to the embodiment shown in FIG. 6 of the present disclosure. For ease of description, only parts related to this embodiment are shown.

Referring to FIG. 10, the UE includes a processor 1001, a memory 1002, a bus 1003, and a radio frequency module 1004, where the processor 1001 and the memory 1002 communicate with each other by using the bus 1003, the memory 1002 is configured to store a program, the processor 1001 is configured to execute the program stored in the memory 1002, and when the program is executed, the processor 1001 is configured to acquire downlink transmission parameters, where the downlink transmission parameters include a quantity of resource blocks in downlink transmission bandwidth that is configured by a base station for the UE, an antenna port used by the base station for sending the MTC downlink data, and at least one of the following: a cell-specific frequency shift value or a CP type, and set a local oscillator frequency of a receiver according to the downlink transmission parameters, and the radio frequency module is configured to receive the MTC downlink data sent by the base station, where a subcarrier located in a subcarrier reservation location does not carry any data signal or reference signal, the subcarrier reservation location is determined in the downlink transmission bandwidth by the base station according to the downlink transmission parameters, and a central frequency of the subcarrier in the subcarrier reservation location is the same as the local oscillator frequency, set by the UE, of the receiver.

Optionally, the processor 1001 is configured to acquire the downlink transmission parameters, and when the quantity of resource blocks is an odd number, the antenna port is any one of Ports 0 to 3, and the cell-specific frequency shift value is 1 or 4, shift the local oscillator frequency of the receiver from a central location of the downlink transmission bandwidth to a low frequency or a high frequency by half a subcarrier, or when the quantity of resource blocks is an odd number, the antenna port is any one of Ports 0 to 3, and the cell-specific frequency shift value is 0 or 3, shift the local oscillator frequency of the receiver from a central location of the downlink transmission bandwidth to a low frequency by half a subcarrier, or when the quantity of resource blocks is an odd number, the antenna port is any one of Ports 0 to 3, and the cell-specific frequency shift value is 2 or 5, shift the local oscillator frequency of the receiver from a central location of the downlink transmission bandwidth to a high frequency by half a subcarrier.

Optionally, the processor 1001 is configured to acquire the downlink transmission parameters, and when the quantity of resource blocks is an odd number, the antenna port is Port 5, the CP type is a normal CP, and the cell-specific frequency shift value is 0 or 2, shift the local oscillator frequency of the receiver from a central location of the downlink transmission bandwidth to a low frequency by half a subcarrier, or when the quantity of resource blocks is an odd number, the antenna port is Port 5, the CP type is a normal CP, and the cell-specific frequency shift value is 1, shift the local oscillator frequency of the receiver from a central location of the downlink transmission bandwidth to a high frequency by half a subcarrier, or when the quantity of resource blocks is an odd number, the antenna port is Port 5, the CP type is an extended CP, and the cell-specific frequency shift value is 0, shift the local oscillator frequency of the receiver from a central location of the downlink transmission bandwidth to a high frequency or a low frequency by 1.5 subcarriers, or when the quantity of resource blocks is an odd number, the antenna port is Port 5, the CP type is an extended CP, and the cell-specific frequency shift value is 1, shift the local oscillator frequency of the receiver from a central location of the downlink transmission bandwidth to a low frequency by half a subcarrier, or when the quantity of resource blocks is an odd number, the antenna port is Port 5, the CP type is an extended CP, and the cell-specific frequency shift value is 2, shift the local oscillator frequency of the receiver from a central location of the downlink transmission bandwidth to a high frequency by half a subcarrier.

Optionally, the processor 1001 is configured to acquire the downlink transmission parameters, and when the quantity of resource blocks is an odd number, the CP type is a normal CP, and the antenna port is one or more of Ports 7, 8, 11, and 13, set, by the UE, the local oscillator frequency of the receiver to be in a location in which the fifth subcarrier of a resource block located at a center of the downlink transmission bandwidth is located, or when the quantity of resource blocks is an odd number, the CP type is a normal CP, and the antenna port is one or more of Ports 9, 10, 12, and 14, set, by the UE, the local oscillator frequency of the receiver to be in a location in which the sixth subcarrier of a resource block located at a center of the downlink transmission bandwidth is located, or when the quantity of resource blocks is an odd number, the CP type is an extended CP, and the antenna port is Port 7 or Port 8, set, by the UE, the local oscillator frequency of the receiver to be in a location in which the fifth or sixth subcarrier of a resource block located at a center of the downlink transmission bandwidth is located.

Optionally, the processor 1001 is configured to acquire the downlink transmission parameters, and when the quantity of resource blocks is an even number, set the local oscillator frequency of the receiver to be between a first resource block and a second resource block, where the first resource block and the second block resource are two adjacent resource blocks that are located at a center of the downlink transmission bandwidth, and a frequency at which the first resource block is located is higher than a frequency at which the second resource block is located.

Optionally, the processor 1001 is configured to acquire the downlink transmission parameters, and when the quantity of resource blocks is an even number and the downlink transmission bandwidth covers a system direct current, set the local oscillator frequency of the receiver to be in a central location of a first resource block or a central location of a second resource block, where the first resource block and the second resource block are two adjacent resource blocks that are located at a center of the downlink transmission bandwidth, and a frequency at which the first resource block is located is higher than a frequency at which the second resource block is located.

Optionally, the radio frequency module 1004 is configured to discard a CRS resource element interfered by an MTC direct current.

According to this embodiment of the present disclosure, in a process of transmitting MTC downlink data, a base station sends the MTC downlink data after discarding a subcarrier, and a UE resets a local oscillator frequency of a receiver according to downlink transmission parameters of MTC data, so as to complete correct reception of the data, thereby preventing a new direct current introduced due to narrow band radio frequency reception of the UE from affecting accurate reception of a subcarrier nearby the direct current.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for sending machine type communication (MTC) downlink data, comprising:
    configuring, by a base station, downlink transmission bandwidth for a user equipment (UE);
    determining, by the base station, an antenna port used for sending the MTC downlink data;
    determining, by the base station, a subcarrier reservation location in the downlink transmission bandwidth according to downlink transmission parameters, wherein the downlink transmission parameters comprise a quantity of resource blocks in the downlink transmission bandwidth, the antenna port, and at least one of the following: a cell-specific frequency shift value and a cyclic prefix (CP) type; and
    sending, by the base station, the MTC downlink data to the UE, so that the UE receives the MTC downlink data after setting a local oscillator frequency of a receiver according to the downlink transmission parameters,
    wherein a subcarrier located in the subcarrier reservation location does not carry any data signal or reference signal,
    wherein a central frequency of the subcarrier in the subcarrier reservation location is the same as the local oscillator frequency, set by the UE, of the receiver,
    wherein the quantity of resource blocks is an odd number,
    wherein the downlink transmission parameters further comprise the CP type, and
    wherein determining, by the base station, the subcarrier reservation location in the downlink transmission bandwidth according to the downlink transmission parameters comprises:
        determining, by the base station, a location in which a fifth subcarrier of a resource block located at a center of the downlink transmission bandwidth is located, as the subcarrier reservation location when the CP type is a normal CP and the antenna port is one or more of Ports 7, 8, 11, and 13;
        determining, by the base station, a location in which a sixth subcarrier of the resource block located at the center of the downlink transmission bandwidth is located, as the subcarrier reservation location when the CP type is a normal CP and the antenna port is one or more of Ports 9, 10, 12, and 14; and
        determining, by the base station, the location in which the fifth or the sixth subcarrier of the resource block located at the center of the downlink transmission bandwidth is located, as the subcarrier reservation location when the CP type is an extended CP and the antenna port is Port 7 or Port 8.

2. The method according to claim 1, wherein the quantity of resource blocks is an odd number, wherein the antenna port is any one of Ports 0 to 3, wherein the downlink transmission parameters further comprise the cell-specific frequency shift value, and wherein determining, by the base station, the subcarrier reservation location in the downlink transmission bandwidth according to downlink transmission parameters comprises:
    determining, by the base station, a location in which the fifth subcarrier or the sixth subcarrier of the resource block located at a center of the downlink transmission bandwidth is located, as the subcarrier reservation location when the cell-specific frequency shift value is 1 or 4;
    determining, by the base station, the location in which the fifth subcarrier of the resource block located at the center of the downlink transmission bandwidth is located, as the subcarrier reservation location when the cell-specific frequency shift value is 0 or 3; and
    determining, by the base station, the location in which the sixth subcarrier of the resource block located at the center of the downlink transmission bandwidth is located, as the subcarrier reservation location when the cell-specific frequency shift value is 2 or 5.

3. The method according to claim 1, wherein the quantity of resource blocks is an odd number, wherein the antenna port is Port 5, wherein the downlink transmission parameters further comprise the cell-specific frequency shift value and the CP type, and wherein determining, by the base station, the subcarrier reservation location in the downlink transmission bandwidth according to the downlink transmission parameters comprises:
    determining, by the base station, a location in which the fifth subcarrier of the resource block located at a center of the downlink transmission bandwidth is located, as the subcarrier reservation location when the CP type is a normal CP and the cell-specific frequency shift value is 0 or 2;
    determining, by the base station, a location in which the sixth subcarrier of the resource block located at the center of the downlink transmission bandwidth is located, as the subcarrier reservation location when the CP type is the normal CP and the cell-specific frequency shift value is 1;
    determining, by the base station, a location in which the fourth or seventh subcarrier of the resource block located at the center of the downlink transmission bandwidth is located, as the subcarrier reservation location when the CP type is an extended CP and the cell-specific frequency shift value is 0;

determining, by the base station, the location in which the fifth subcarrier of the resource block located at the center of the downlink transmission bandwidth is located, as the subcarrier reservation location when the CP type is the extended CP and the cell-specific frequency shift value is 1; and determining, by the base station, the location in which the sixth subcarrier of the resource block located at the center of the downlink transmission bandwidth is located, as the subcarrier reservation location when the CP type is the extended CP and the cell-specific frequency shift value is 2.

4. The method according to claim 1, wherein the quantity of resource blocks is an even number, wherein the antenna port is any one of Ports 0 to 3, wherein the downlink transmission parameters further comprise the cell-specific frequency shift value, and wherein determining, by the base station, the subcarrier reservation location in the downlink transmission bandwidth according to downlink transmission parameters comprises:

determining, by the base station, a location in which the eleventh subcarrier of a first resource block or the zeroth subcarrier of a second resource block is located, as the subcarrier reservation location when the cell-specific frequency shift value is 1 or 4;

determining, by the base station, the location in which the eleventh subcarrier of the first resource block is located, as the subcarrier reservation location when the cell-specific frequency shift value is 0 or 3; and determining, by the base station, the location in which the zeroth subcarrier of the second resource block is located, as the subcarrier reservation location when the cell-specific frequency shift value is 2 or 5, wherein the first resource block and the second resource block are two adjacent resource blocks that are located at the center of the downlink transmission bandwidth, and wherein a frequency at which the first resource block is located is higher than a frequency at which the second resource block is located.

5. The method according to claim 1, wherein the quantity of resource blocks is an even number and the antenna port is Port 5, wherein the downlink transmission parameters further comprise the cell-specific frequency shift value and the CP type, and wherein determining, by the base station, the subcarrier reservation location in the downlink transmission bandwidth according to downlink transmission parameters comprises:

determining, by the base station, a location in which the eleventh subcarrier of a first resource block is located, as the subcarrier reservation location when the CP type is a normal CP and the cell-specific frequency shift value is 0 or 2;

determining, by the base station, a location in which the zeroth subcarrier of a second resource block is located, as the subcarrier reservation location when the CP type is the normal CP and the cell-specific frequency shift value is 1;

determining, by the base station, a location in which the tenth subcarrier of the first resource block or the first subcarrier of the second resource block is located, as the subcarrier reservation location when the CP type is an extended CP and the cell-specific frequency shift value is 0;

determining, by the base station, the location in which the eleventh subcarrier of the first resource block is located, as the subcarrier reservation location when the CP type is the extended CP and the cell-specific frequency shift value is 1; and determining, by the base station, the location in which the zeroth subcarrier of the second resource block is located, as the subcarrier reservation location when the CP type is the extended CP and the cell-specific frequency shift value is 2, wherein the first resource block and the second resource block are two adjacent resource blocks that are located at the center of the downlink transmission bandwidth, and a frequency at which the first resource block is located is higher than a frequency at which the second resource block is located.

6. The method according to claim 1, wherein the quantity of resource blocks is an even number, wherein the downlink transmission parameters further comprise the CP type, and wherein determining, by the base station, the subcarrier reservation location in the downlink transmission bandwidth according to downlink transmission parameters comprises:

determining, by the base station, a location in which the zeroth subcarrier of a second resource block is located, as the subcarrier reservation location when the CP type is a normal CP and the antenna port is one or more of Ports 7, 8, 11, and 13;

determining, by the base station, a location in which the eleventh subcarrier of a first resource block is located, as the subcarrier reservation location when the CP type is the normal CP and the antenna port is one or more of Ports 9, 10, 12, and 14; and determining, by the base station, the location in which the zeroth subcarrier of the second resource block or the eleventh subcarrier of the first resource block is located, as the subcarrier reservation location when the CP type is an extended CP and the antenna port is Port 7 or Port 8, wherein the first resource block and the second resource block are two adjacent resource blocks that are located at the center of the downlink transmission bandwidth, and wherein a frequency at which the first resource block is located is higher than a frequency at which the second resource block is located.

7. The method according to claim 1, wherein determining, by the base station, the antenna port used for sending the MTC downlink data comprises:

configuring, by the base station among the antenna ports 7, 8, 11, and 13, the antenna port for an enhanced physical downlink control channel (ePDCCH) and a physical downlink shared channel (PDSCH); or configuring, by the base station among the antenna ports Ports 9, 10, 12, and 14, the antenna port for the ePDCCH and the PDSCH.

8. The method according to claim 1, wherein the base station supports multi-layer transmission, and wherein determining, by the base station, the antenna port used for sending the MTC downlink data comprises:

configuring, by the base station among the antenna ports Ports 7, 8, 11, and 13, the antenna port for the UE; or configuring, by the base station among the antenna ports Ports 9, 10, 12, and 14, the antenna port for the UE.

9. A method for receiving machine type communication (MTC) downlink data, comprising:

acquiring, by a user equipment (UE), downlink transmission parameters, wherein the downlink transmission parameters comprise a quantity of resource blocks in downlink transmission bandwidth that is configured by a base station for the UE, an antenna port used by the base station for sending the MTC downlink data, and at least one of the following: a cell-specific frequency shift value and a cyclic prefix (CP) type;
setting, by the UE, a local oscillator frequency of a receiver according to the downlink transmission parameters; and
receiving, by the UE, the MTC downlink data sent by the base station,
wherein a subcarrier located in a subcarrier reservation location does not carry any data signal or reference signal,
wherein the subcarrier reservation location is determined in the downlink transmission bandwidth by the base station according to the downlink transmission parameters,
wherein a central frequency of the subcarrier in the subcarrier reservation location is the same as the local oscillator frequency, set by the UE, of the receiver,
wherein the quantity of resource blocks is an odd number,
wherein the downlink transmission parameters further comprise the CP type,
wherein setting, by the UE, the local oscillator frequency of the receiver according to the downlink transmission parameters comprises:
setting, by the UE, the local oscillator frequency of the receiver to be in a location in which a fifth subcarrier of a resource block located at a center of the downlink transmission bandwidth is located when the CP type is a normal CP and the antenna port is one or more of Ports 7, 8, 11, and 13;
setting, by the UE, the local oscillator frequency of the receiver to be in a location in which a sixth subcarrier of the resource block located at the center of the downlink transmission bandwidth is located when the CP type is the normal CP and the antenna port is one or more of Ports 9, 10, 12, and 14; and
setting, by the UE, the local oscillator frequency of the receiver to be in the location in which the fifth subcarrier or the sixth subcarrier of the resource block located at the center of the downlink transmission bandwidth is located when the CP type is an extended CP and the antenna port is Port 7 or Port 8.

10. The method according to claim 9, wherein the quantity of resource blocks is an even number, and wherein setting, by the UE, the local oscillator frequency of the receiver according to the downlink transmission parameters comprises setting, by the UE, the local oscillator frequency of the receiver to be between a first resource block and a second resource block, wherein the first resource block and the second block resource are two adjacent resource blocks that are located at a center of the downlink transmission bandwidth, and wherein a frequency at which the first resource block is located is higher than a frequency at which the second resource block is located.

11. The method according to claim 9, wherein the quantity of resource blocks is an even number, wherein the downlink transmission bandwidth covers a system direct current, and wherein setting, by the UE, the local oscillator frequency of the receiver according to the downlink transmission parameters comprises setting, by the UE, the local oscillator frequency of the receiver to be in a central location of a first resource block or a central location of a second resource block, wherein the first resource block and the second block resource are two adjacent resource blocks that are located at a center of the downlink transmission bandwidth, and wherein a frequency at which the first resource block is located is higher than a frequency at which the second resource block is located.

12. The method according to claim 9, wherein receiving, by the UE, the MTC downlink data sent by the base station comprises discarding, by the UE, a common reference signal (CRS) resource element (RE) interfered by an MTC direct current.

13. A method for receiving machine type communication (MTC) downlink data, comprising:
acquiring, by a user equipment (UE), downlink transmission parameters, wherein the downlink transmission parameters comprise a quantity of resource blocks in downlink transmission bandwidth that is configured by a base station for the UE, an antenna port used by the base station for sending the MTC downlink data, and at least one of the following: a cell-specific frequency shift value and a cyclic prefix (CP) type;
setting, by the UE, a local oscillator frequency of a receiver according to the downlink transmission parameters; and
receiving, by the UE, the MTC downlink data sent by the base station,
wherein a subcarrier located in a subcarrier reservation location does not carry any data signal or reference signal,
wherein the subcarrier reservation location is determined in the downlink transmission bandwidth by the base station according to the downlink transmission parameters,
wherein a central frequency of the subcarrier in the subcarrier reservation location is the same as the local oscillator frequency, set by the UE, of the receiver,
wherein the quantity of resource blocks is an odd number,
wherein the antenna port is any one of Ports 0 to 3,
wherein the downlink transmission parameters further comprise the cell-specific frequency shift value, and
wherein setting, by the UE, the local oscillator frequency of the receiver according to the downlink transmission parameters comprises:
shifting, by the UE, the local oscillator frequency of the receiver from a central location of the downlink transmission bandwidth to a low frequency or a high frequency by half a subcarrier when the cell-specific frequency shift value is 1 or 4;
shifting, by the UE, the local oscillator frequency of the receiver from the central location of the downlink transmission bandwidth to a low frequency by half the subcarrier when the cell-specific frequency shift value is 0 or 3; and
shifting, by the UE, the local oscillator frequency of the receiver from the central location of the downlink transmission bandwidth to the high frequency by half the subcarrier when the cell-specific frequency shift value is 2 or 5.

14. A method for receiving machine type communication (MTC) downlink data, comprising:
acquiring, by a user equipment (UE), downlink transmission parameters, wherein the downlink transmission parameters comprise a quantity of resource blocks in downlink transmission bandwidth that is configured by a base station for the UE, an antenna port used by the base station for sending the MTC downlink data, and at least one of the following: a cell-specific frequency shift value and a cyclic prefix (CP) type;
setting, by the UE, a local oscillator frequency of a receiver according to the downlink transmission parameters; and
receiving, by the UE, the MTC downlink data sent by the base station, wherein a subcarrier located in a subcarrier reservation location does not carry any data signal or reference signal, wherein the subcarrier reservation location is determined in the downlink transmission bandwidth by the base station according to the downlink transmission parameters, wherein a central frequency of the subcarrier in the subcarrier reservation location is the same as the local oscillator frequency, set by the UE, of the receiver, wherein the quantity of resource blocks is an odd number, wherein the antenna port is Port 5, wherein the downlink transmission parameters further comprise the cell-specific frequency shift value and the CP type, and wherein setting, by the UE, the local oscillator frequency of the receiver according to the downlink transmission parameters comprises:

shifting, by the UE, the local oscillator frequency of the receiver from a central location of the downlink transmission bandwidth to a low frequency by half a subcarrier when the CP type is a normal CP and the cell-specific frequency shift value is 0 or 2;

shifting, by the UE, the local oscillator frequency of the receiver from the central location of the downlink transmission bandwidth to a high frequency by half the subcarrier when the CP type is the normal CP and the cell-specific frequency shift value is 1;

shifting, by the UE, the local oscillator frequency of the receiver from the central location of the downlink transmission bandwidth to the high frequency or the low frequency by 1.5 subcarriers when the CP type is an extended CP and the cell-specific frequency shift value is 0;

shifting, by the UE, the local oscillator frequency of the receiver from the central location of the downlink transmission bandwidth to the low frequency by half the subcarrier when the CP type is the extended CP and the cell-specific frequency shift value is 1; and shifting, by the UE, the local oscillator frequency of the receiver from the central location of the downlink transmission bandwidth to a high frequency by half the subcarrier when the CP type is the extended CP and the cell-specific frequency shift value is 2.

15. A base station, comprising:
a memory, wherein the memory is configured to store a program;
a bus;
a processor, wherein the processor and the memory communicate with each other by using the bus, wherein the processor is configured to execute the program stored in the memory, and wherein when the program is executed, the processor is configured to:
configure downlink transmission bandwidth for a user equipment (UE);
determine an antenna port used for sending machine type communication (MTC) downlink data; and
determine a subcarrier reservation location in the downlink transmission bandwidth according to downlink transmission parameters, wherein the downlink transmission parameters comprise a quantity of resource blocks in the downlink transmission bandwidth, the antenna port, and at least one of the following: a cell-specific frequency shift value and a cyclic prefix (CP) type; and a radio frequency module,
wherein the radio frequency module is connected to the processor and is configured to send the MTC downlink data to the UE, so that the UE receives the MTC downlink data after setting a local oscillator frequency of a receiver according to the downlink transmission parameters, wherein a subcarrier located in the subcarrier reservation location does not carry any data signal or reference signal, wherein a central frequency of the subcarrier in the subcarrier reservation location is the same as the local oscillator frequency, set by the UE, of the receiver, and wherein the processor is configured to:
configure the downlink transmission bandwidth for the UE;
determine the antenna port used for sending the MTC downlink data; and
determine a location in which a fifth subcarrier or a sixth subcarrier of a resource block located at a center of the downlink transmission bandwidth is located, as the subcarrier reservation location when the quantity of resource blocks is an odd number, the antenna port is any one of Ports 0 to 3, and the cell-specific frequency shift value is 1 or 4;
determine a location in which the fifth subcarrier of the resource block located at the center of the downlink transmission bandwidth is located, as the subcarrier reservation location when the quantity of resource blocks is an odd number, the antenna port is any one of Ports 0 to 3, and the cell-specific frequency shift value is 0 or 3; and
determine the location in which the sixth subcarrier of the resource block located at the center of the downlink transmission bandwidth is located, as the subcarrier reservation location when the quantity of resource blocks is an odd number, the antenna port is any one of Ports 0 to 3, and the cell-specific frequency shift value is 2 or 5.

16. The base station according to claim 15, wherein the processor is configured to:
configure the downlink transmission bandwidth for the UE;
determine the antenna port used for sending the MTC downlink data; and
determine a location in which the fifth subcarrier of the resource block located at a center of the downlink transmission bandwidth is located, as the subcarrier reservation location when the quantity of resource blocks is an odd number, the antenna port is Port 5, the CP type is a normal CP, and the cell-specific frequency shift value is 0 or 2;
determine a location in which the sixth subcarrier of the resource block located at the center of the downlink transmission bandwidth is located, as the subcarrier reservation location when the quantity of resource blocks is an odd number, the antenna port is Port 5, the CP type is a normal CP, and the cell-specific frequency shift value is 1;
determine the location in which the fourth or seventh subcarrier of the resource block located at the center of the downlink transmission bandwidth is located, as the subcarrier reservation location when the quantity of resource blocks is an odd number, the antenna port is Port 5, the CP type is an extended CP, and the cell-specific frequency shift value is 0;

determine the location in which the fifth subcarrier of the resource block located at the center of the downlink transmission bandwidth is located, as the subcarrier reservation location when the quantity of resource blocks is an odd number, the antenna port is Port 5, the CP type is an extended CP, and the cell-specific frequency shift value is 1; and determine the location in which the sixth subcarrier of the resource block located at the center of the downlink transmission bandwidth is located, as the subcarrier reservation location when the quantity of resource blocks is an odd number, the antenna port is Port 5, the CP type is an extended CP, and the cell-specific frequency shift value is 2.

17. The base station according to claim 15, wherein the processor is configured to:

configure the downlink transmission bandwidth for the UE;

determine the antenna port used for sending the MTC downlink data; and determine a location in which the fifth subcarrier of the resource block located at a center of the downlink transmission bandwidth is located, as the subcarrier reservation location when the quantity of resource blocks is an odd number, the CP type is a normal CP, and the antenna port is one or more of Ports 7, 8, 11, and 13;

determine a location in which the sixth subcarrier of the resource block located at the center of the downlink transmission bandwidth is located, as the subcarrier reservation location when the quantity of resource blocks is an odd number, the CP type is a normal CP, and the antenna port is one or more of Ports 9, 10, 12, and 14; and determine the location in which the fifth subcarrier or the sixth subcarrier of the resource block located at the center of the downlink transmission bandwidth is located, as the subcarrier reservation location when the quantity of resource blocks is an odd number, the CP type is an extended CP, and the antenna port is Port 7 or Port 8.

18. The base station according to claim 17, wherein determining the antenna port used for sending the MTC downlink data comprises:

configuring, among the antenna ports Ports 7, 8, 11, and 13, the antenna port for an enhanced physical downlink control channel (ePDCCH) and a physical downlink shared channel (PDSCH); or configuring, among the antenna ports Ports 9, 10, 12, and 14, the antenna port for the ePDCCH and the PDSCH.

19. The base station according to claim 17, wherein the base station supports multi-layer transmission, and wherein determining the antenna port used for sending the MTC downlink data comprises:

configuring, among the antenna ports Ports 7, 8, 11, and 13, the antenna port for the UE; or configuring, among the antenna ports Ports 9, 10, 12, and 14, the antenna port for the UE.

20. The base station according to claim 15, wherein the processor is configured to:

configure the downlink transmission bandwidth for the UE;

determine the antenna port used for sending the MTC downlink data; and determine a location in which the eleventh subcarrier of a first resource block or the zeroth subcarrier of a second resource block is located, as the subcarrier reservation location when the quantity of resource blocks is an even number, the antenna port is any one of Ports 0 to 3, and the cell-specific frequency shift value is 1 or 4;

determine the location in which the eleventh subcarrier of the first resource block is located, as the subcarrier reservation location when the quantity of resource blocks is an even number, the antenna port is any one of Ports 0 to 3, and the cell-specific frequency shift value is 0 or 3; and determine the location in which the zeroth subcarrier of the second resource block is located, as the subcarrier reservation location when the quantity of resource blocks is an even number, the antenna port is any one of Ports 0 to 3, and the cell-specific frequency shift value is 2 or 5, wherein the first resource block and the second resource block are two adjacent resource blocks that are located at a center of the downlink transmission bandwidth, and wherein a frequency at which the first resource block is located is higher than a frequency at which the second resource block is located.

21. The base station according to claim 15, wherein the processor is configured to:

configure the downlink transmission bandwidth for the UE;

determine the antenna port used for sending the MTC downlink data;

determine a location in which the eleventh subcarrier of a first resource block is located, as the subcarrier reservation location when the quantity of resource blocks is an even number, the antenna port is Port 5, the CP type is a normal CP, and the cell-specific frequency shift value is 0 or 2;

determine a location in which the zeroth subcarrier of a second resource block is located, as the subcarrier reservation location when the quantity of resource blocks is an even number, the antenna port is Port 5, the CP type is a normal CP, and the cell-specific frequency shift value is 1;

determine the location in which the tenth subcarrier of the first resource block or the first subcarrier of the second resource block is located, as the subcarrier reservation location when the quantity of resource blocks is an even number, the antenna port is Port 5, the CP type is an extended CP, and the cell-specific frequency shift value is 0;

determine the location in which the eleventh subcarrier of the first resource block is located, as the subcarrier reservation location when the quantity of resource blocks is an even number, the antenna port is Port 5, the CP type is an extended CP, and the cell-specific frequency shift value is 1; and determine the location in which the zeroth subcarrier of the second resource block is located, as the subcarrier reservation location, wherein the first resource block and the second resource block are two adjacent resource blocks that are located at the center of the downlink transmission bandwidth, and wherein a frequency at which the first resource block is located is higher than a frequency at which the second resource block is located when the quantity of resource blocks is an even number, the antenna port is Port 5, the CP type is an extended CP, and the cell-specific frequency shift value is 2.

22. The base station according to claim 15, wherein the processor is configured to:

configure the downlink transmission bandwidth for the UE;

determine the antenna port used for sending the MTC downlink data;

determine a location in which the zeroth subcarrier of a second resource block is located, as the subcarrier reservation location when the quantity of resource blocks is an even number, the CP type is a normal CP, and the antenna port is one or more of Ports 7, 8, 11, and 13;

determine the location in which the eleventh subcarrier of the first resource block is located, as the subcarrier reservation location when the quantity of resource blocks is an even number, the CP type is a normal CP, and the antenna port is one or more of Ports 9, 10, 12, and 14; and determine the location in which the zeroth subcarrier of the second resource block or the eleventh subcarrier of the first resource block is located, as the subcarrier reservation location when the quantity of resource blocks is an even number, the CP type is an extended CP, and the antenna port is Port 7 or Port 8, wherein the first resource block and the second resource block are two adjacent resource blocks that are located at the center of the downlink transmission bandwidth, and wherein a frequency at which the first resource block is located is higher than a frequency at which the second resource block is located.

23. A user equipment (UE), comprising:
a memory, wherein the memory is configured to store a program;
a bus,
a processor, wherein the processor and the memory communicate with each other by using the bus, wherein the processor is configured to execute the program stored in the memory, and wherein when the program is executed, the processor is configured to:
  acquire downlink transmission parameters, wherein the downlink transmission parameters comprise a quantity of resource blocks in downlink transmission bandwidth that is configured by a base station for the UE, an antenna port used by the base station for sending machine type communication (MTC) downlink data, and at least one of the following: a cell-specific frequency shift value and a cyclic prefix (CP) type; and
  set a local oscillator frequency of a receiver according to the downlink transmission parameters; and
a radio frequency module,
wherein the radio frequency module is configured to receive the MTC downlink data sent by the base station,
wherein a subcarrier located in a subcarrier reservation location does not carry any data signal or reference signal,
wherein the subcarrier reservation location is determined in the downlink transmission bandwidth by the base station according to the downlink transmission parameters,
wherein a central frequency of the subcarrier in the subcarrier reservation location is the same as the local oscillator frequency, set by the UE, of the receiver, and
wherein the processor is configured to:
  acquire the downlink transmission parameters;
  shift the local oscillator frequency of the receiver from a central location of the downlink transmission bandwidth to a low frequency or a high frequency by half a subcarrier when the quantity of resource blocks is an odd number, the antenna port is any one of Ports 0 to 3, and the cell-specific frequency shift value is 1 or 4;
  shift the local oscillator frequency of the receiver from the central location of the downlink transmission bandwidth to the low frequency by half the subcarrier when the quantity of resource blocks is an odd number, the antenna port is any one of Ports 0 to 3, and the cell-specific frequency shift value is 0 or 3; and
  shift the local oscillator frequency of the receiver from the central location of the downlink transmission bandwidth to the high frequency by half the subcarrier when the quantity of resource blocks is an odd number, the antenna port is any one of Ports 0 to 3, and the cell-specific frequency shift value is 2 or 5.

24. The UE according to claim 23, wherein the processor is configured to:
acquire the downlink transmission parameters; and
set the local oscillator frequency of the receiver to be between a first resource block and a second resource block when the quantity of resource blocks is an even number, wherein the first resource block and the second block resource are two adjacent resource blocks that are located at a center of the downlink transmission bandwidth, and wherein a frequency at which the first resource block is located is higher than a frequency at which the second resource block is located.

25. The UE according to claim 23, wherein the processor is configured to:
acquire the downlink transmission parameters; and
set the local oscillator frequency of the receiver to be in a central location of a first resource block or a central location of a second resource block when the quantity of resource blocks is an even number and the downlink transmission bandwidth covers a system direct current, wherein the first resource block and the second resource block are two adjacent resource blocks that are located at a center of the downlink transmission bandwidth, and wherein a frequency at which the first resource block is located is higher than a frequency at which the second resource block is located.

26. The UE according to claim 23, wherein the radio frequency module is configured to discard a common reference signal (CRS) resource element (RE) interfered by an MTC direct current.

27. A user equipment (UE), comprising:
a memory, wherein the memory is configured to store a program;
a bus,
a processor, wherein the processor and the memory communicate with each other by using the bus, wherein the processor is configured to execute the program stored in the memory, and wherein when the program is executed, the processor is configured to:
  acquire downlink transmission parameters, wherein the downlink transmission parameters comprise a quantity of resource blocks in downlink transmission bandwidth that is configured by a base station for the UE, an antenna port used by the base station for sending machine type communication (MTC) downlink data, and at least one of the following: a cell-specific frequency shift value and a cyclic prefix (CP) type; and
  set a local oscillator frequency of a receiver according to the downlink transmission parameters; and a radio frequency module,
wherein the radio frequency module is configured to receive the MTC downlink data sent by the base station,
wherein a subcarrier located in a subcarrier reservation location does not carry any data signal or reference signal,
wherein the subcarrier reservation location is determined in the downlink transmission bandwidth by the base station according to the downlink transmission parameters,
wherein a central frequency of the subcarrier in the subcarrier reservation location is the same as the local oscillator frequency, set by the UE, of the receiver, and
wherein the processor is configured to:
acquire the downlink transmission parameters;
shift the local oscillator frequency of the receiver from a central location of the downlink transmission bandwidth to a low frequency by half a subcarrier when the quantity of resource blocks is an odd number, the antenna port is Port 5, the CP type is a normal CP, and the cell-specific frequency shift value is 0 or 2;
shift the local oscillator frequency of the receiver from the central location of the downlink transmission bandwidth to a high frequency by half the subcarrier when the quantity of resource blocks is an odd number, the antenna port is Port 5, the CP type is a normal CP, and the cell-specific frequency shift value is 1;
shift the local oscillator frequency of the receiver from the central location of the downlink transmission bandwidth to the high frequency or the low frequency by 1.5 subcarriers when the quantity of resource blocks is an odd number, the antenna port is Port 5, the CP type is an extended CP, and the cell-specific frequency shift value is 0;
shift the local oscillator frequency of the receiver from the central location of the downlink transmission bandwidth to the low frequency by half the subcarrier when the quantity of resource blocks is an odd number, the antenna port is Port 5, the CP type is an extended CP, and the cell-specific frequency shift value is 1; and
shift the local oscillator frequency of the receiver from the central location of the downlink transmission bandwidth to the high frequency by half the subcarrier when the quantity of resource blocks is an odd number, the antenna port is Port 5, the CP type is an extended CP, and the cell-specific frequency shift value is 2.

28. A user equipment (UE), comprising:
a memory, wherein the memory is configured to store a program;
a bus,
a processor, wherein the processor and the memory communicate with each other by using the bus, wherein the processor is configured to execute the program stored in the memory, and wherein when the program is executed, the processor is configured to:
acquire downlink transmission parameters, wherein the downlink transmission parameters comprise a quantity of resource blocks in downlink transmission bandwidth that is configured by a base station for the UE, an antenna port used by the base station for sending machine type communication (MTC) downlink data, and at least one of the following: a cell-specific frequency shift value and a cyclic prefix (CP) type; and
set a local oscillator frequency of a receiver according to the downlink transmission parameters; and
a radio frequency module,
wherein the radio frequency module is configured to receive the MTC downlink data sent by the base station,
wherein a subcarrier located in a subcarrier reservation location does not carry any data signal or reference signal,
wherein the subcarrier reservation location is determined in the downlink transmission bandwidth by the base station according to the downlink transmission parameters,
wherein a central frequency of the subcarrier in the subcarrier reservation location is the same as the local oscillator frequency, set by the UE, of the receiver, and
wherein the processor is configured to:
acquire the downlink transmission parameters; and
set the local oscillator frequency of the receiver to be in a location in which a fifth subcarrier of a resource block located at a center of the downlink transmission bandwidth is located when the quantity of resource blocks is an odd number, the CP type is a normal CP, and the antenna port is one or more of Ports 7, 8, 11, and 13;
set the local oscillator frequency of the receiver to be in a location in which a sixth subcarrier of the resource block located at the center of the downlink transmission bandwidth is located when the quantity of resource blocks is an odd number, the CP type is a normal CP, and the antenna port is one or more of Ports 9, 10, 12, and 14; and
set the local oscillator frequency of the receiver to be in the location in which the fifth subcarrier or the sixth subcarrier of the resource block located at the center of the downlink transmission bandwidth is located when the quantity of resource blocks is an odd number, the CP type is an extended CP, and the antenna port is Port 7 or Port 8.

* * * * *